US012711092B2

(12) United States Patent
Yamamoto et al.

(10) Patent No.: US 12,711,092 B2
(45) Date of Patent: Aug. 18, 2026

(54) ELECTRONIC DEVICE AND TRANSMISSION SYSTEM

(71) Applicant: SONY GROUP CORPORATION, Tokyo (JP)

(72) Inventors: Masanari Yamamoto, Tokyo (JP); Kazuaki Toba, Tokyo (JP); Hiroshi Morita, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 41 days.

(21) Appl. No.: 18/709,278

(22) PCT Filed: Nov. 8, 2022

(86) PCT No.: PCT/JP2022/041604
§ 371 (c)(1),
(2) Date: May 10, 2024

(87) PCT Pub. No.: WO2023/090207
PCT Pub. Date: May 25, 2023

(65) Prior Publication Data

US 2025/0013596 A1 Jan. 9, 2025

(30) Foreign Application Priority Data

Nov. 18, 2021 (JP) ................................ 2021-187606

(51) Int. Cl.
*G06F 13/42* (2006.01)
*H04L 12/40* (2006.01)

(52) U.S. Cl.
CPC .... *G06F 13/4247* (2013.01); *H04L 12/40182* (2013.01)

(58) Field of Classification Search
CPC ..... H04L 12/28; H04L 12/40182; G09G 5/00; G06F 13/4247
See application file for complete search history.

(56) References Cited

U.S. PATENT DOCUMENTS

2003/0074505 A1* 4/2003 Andreas .............. G06F 13/4256 710/110
2009/0271556 A1* 10/2009 Rutherford, III ... G06F 13/4022 710/313

(Continued)

FOREIGN PATENT DOCUMENTS

JP 10-032545 A 2/1998
JP 2001-222788 A 8/2001

OTHER PUBLICATIONS

International Search Report and Written Opinion of PCT Application No. PCT/JP2022/041604, issued on Jan. 24, 2023, 09 pages of ISRWO.

*Primary Examiner* — Phong H Dang
(74) *Attorney, Agent, or Firm* — CHIP LAW GROUP

(57) ABSTRACT

Provided is an electronic device that includes a first terminal and a second terminal for a daisy chain connection. The first terminal and the second terminal each have a plurality of channels. Some of the channels of the first terminal are shifted and directly connected to some of the channels of the second terminal. For example, communication circuits (a transmit/receive circuit, a transmitting circuit, or a receiving circuit) are connected to other channels of the first terminal and other channels of the second terminal.

17 Claims, 28 Drawing Sheets

(56) References Cited

U.S. PATENT DOCUMENTS

| | | | | |
|---|---|---|---|---|
| 2010/0006349 | A1* | 1/2010 | Lee | G06F 3/04166 178/18.03 |
| 2014/0156903 | A1* | 6/2014 | Chang | G06F 3/0607 710/308 |

* cited by examiner

NETWORK
14
DEVICE A
15-1
DEVICE B
15-2
DEVICE C
15-3
DEVICE D
15-4
16-1
16-2
16-3
16-4
16-5
16-6

| NUMBER OF CONNECTED DEVICES [DEVICES] | TOTAL NUMBER OF Cables [CABLES] | NUMBER OF DEVICE TERMINALS [TERMINALS/DEVICE] | NUMBER OF Tx/Rx [Tx/Rx/DEVICE] | NUMBER OF Ch [ch/TERMINAL] |
|---|---|---|---|---|
| 2 | 1 | 2 | 2 | 1 |
| 3 | 2 | 2 | 4 | 3 |
| 4 | 3 | 2 | 6 | 6 |
| 5 | 4 | 2 | 8 | 10 |
| n | n-1 | 2 | (n-1)*2 | n*(n-1)/2 |

Fig. 27

| NUMBER OF CONNECTED DEVICES [DEVICES] | TOTAL NUMBER OF Cables [CABLES] | NUMBER OF DEVICE TERMINALS [TERMINALS/DEVICE] | NUMBER OF Tx/Rx [Tx/Rx/DEVICE] | NUMBER OF Ch [ch/TERMINAL] |
|---|---|---|---|---|
| 2 | 1 | 2 | 3 | 3 |
| 3 | 2 | 2 | 5 | 6 |
| 4 | 3 | 2 | 7 | 10 |
| 5 | 4 | 2 | 9 | 15 |
| n | n-1 | 2 | (n-1)*2+1 | n*(n+1)/2 |

ELECTRONIC DEVICE AND TRANSMISSION SYSTEM

CROSS REFERENCE TO RELATED APPLICATIONS

This application is a U.S. National Phase of International Patent Application No. PCT/JP2022/041604 filed on Nov. 8, 2022, which claims priority benefit of Japanese Patent Application No. JP 2021-187606 filed in the Japan Patent Office on Nov. 18, 2021. Each of the above-referenced applications is hereby incorporated herein by reference in its entirety.

TECHNICAL FIELD

The present technique relates to an electronic device and a transmission system and specifically relates to an electronic device or the like that is used in daisy chain connection.

BACKGROUND ART

As the transmission capacity of an interface between electronic devices increases, a daisy chain connection that connects a plurality of electronic devices like a string has been more frequently used as a method for connecting the plurality of electronic devices when the electronic devices are operated in cooperation with one another. In the daisy connection, if one of the electronic devices is connected to the main-output electronic device, other electronic devices can obtain signals through the adjacent electronic devices without being directly connected to the main-output electronic device.

The daisy connection advantageously eliminates complicated wiring as compared with a star connection in which multiple electronic devices make pear-to-pear connection with a main-output electronic device. However, a signal connection is not made between the connected devices.

For example, PTL 1 discloses, for daisy chain connection using an optical interface, a connection method in which all channels other than a channel used for a device in multistage connection are disposed such that channel numbers during output are each shifted by one from channel numbers during input.

Also in the case where many displays are arranged like a multi-tile display, the connection method is a usable connection method that can complete a multi-tile display without the need for an input channel setting or a special configuration only by simply connecting devices with the connection technique in multiple stages. However, the connection method mainly relates to connection between a main output electronic device and each electronic device but does not involve signal connection between electronic devices.

CITATION LIST

Patent Literature

[PTL 1]
JP H10-032545A

SUMMARY

Technical Problem

An object of the present technique is to properly make a signal connection between electronic devices in daisy chain connection.

Solution to Problem

A concept of the present technique is represented by an electronic device including: a first terminal and a second terminal for daisy chain connection, wherein the first terminal and the second terminal each have a plurality of channels, and some of the channels of the first terminal are shifted and directly connected to some of the channels of the second terminal in the device.

In the present technique, the first terminal and the second terminal for daisy chain connection are provided. In this configuration, the first terminal and the second terminal each have a plurality of channels, and some of the channels of the first terminal are shifted and directly connected to some of the channels of the second terminal in the device.

For example, communication circuits may be connected to other channels of the first terminal and other channels of the second terminal. For example, the communication circuit may be a transmit/receive circuit, a communication circuit, or a receiving circuit.

In this case, for example, the communication circuit may be a transmit/receive circuit, and the communication circuit may be configured to transmit information about the device after being turned on, and start transmission and reception of data to and from other devices after receiving the information about the other devices.

In this case, for example, the communication circuit may be a transmit/receive circuit, and the communication circuit may be configured to transmit information about the device and receive information about other devices after being turned on, and start transmission and reception of data to and from the other devices after transmitting the information about the device.

In this case, for example, the communication circuit may be a transmit/receive circuit, and the communication circuit may be configured to transmit information about the device and then start data transmission after being turned on, receive information about other devices, start data reception from the other devices if the other devices are transmitter-receivers, and start data reception from the other devices after stopping data transmission to the other devices if the other devices are transmitters.

In this case, for example, the communication circuit may be a transmit/receive circuit, and the communication circuit may be configured to start data transmission after being turned on to transmit information about the device, periodically transmit the information about the device during intervals between the data transmissions, receive information about other devices, start data reception from the other devices after transmitting the information about the device to the other devices if the other devices are transmitter-receivers, and start data reception from the other devices after stopping the transmission of the information about the device and data to the other devices if the other devices are transmitters.

In this case, for example, the communication circuit may be a transmitting circuit, and the communication circuit may be configured to start data transmission after being turned on to transmit information about the device.

In this case, for example, the communication circuit may be a transmitting circuit, and the communication circuit may be configured to start data transmission after being turned on to transmit information about the device, and periodically transmit the information about the device during intervals between the data transmissions.

In this case, for example, the communication circuit may be a receiving circuit, and the communication circuit may be configured to start data reception after being turned on to receive data from other devices.

For example, the first terminal and the second terminal may each have n*(n−1)/2 channels to allow a daisy chain connection of n electronic devices including the device.

In this case, for example, the communication circuits may be connected to (n−1) channels constituting other channels of the n*(n−1)/2 channels of the first terminal, and the communication circuits may be connected to (n−1) channels constituting other channels of the n*(n−1)/2 channels of the second terminal.

For example, the first terminal and the second terminal may each have n*(n+1)/2 channels to allow a daisy chain connection of n electronic devices including the device to a specific device.

In this case, for example, the communication circuits may be connected to n channels constituting other channels of the n*(n+1)/2 channels of the first terminal, and the communication circuits may be connected to (n−1) channels constituting other channels of the n*(n+1)/2 channels of the second terminal.

As described above, in the present technique, some of the channels of the first terminal are shifted and directly connected to some of the channels of the second terminal in the device. This can properly make a signal connection between the electronic devices to make a daisy chain connection. Furthermore, even if another electronic device is present between the electronic devices to make a signal connection and the electronic devices are turned off, a signal connection can be made without causing any problems.

Another concept of the present technique is represented by a transmission system configured with

- a plurality of electronic devices in daisy chain connection via cables,
- wherein the electronic device includes
- a first terminal and a second terminal for daisy chain connection,
- the first terminal and the second terminal each have a plurality of channels, and
- some of the channels of the first terminal are shifted and directly connected to some of the channels of the second terminal in the device.

In the present technique, the plurality of electronic devices are configured in daisy chain connection via cables, and the electronic device includes the first terminal and the second terminal for daisy chain connection. In this configuration, the first terminal and the second terminal each have a plurality of channels, and some of the channels of the first terminal are shifted and directly connected to some of the channels of the second terminal in the device.

As described above, in the present technique, some of the channels of the first terminal are shifted and directly connected to some of the channels of the second terminal in the electronic device. This can properly make a signal connection between the electronic devices to make a daisy chain connection. Furthermore, even if another electronic device is present between the electronic devices to make a signal connection and the electronic devices are turned off, a signal connection can be made without causing any problems.

In the present technique, for example, communication circuits may be connected to other channels of the first terminal and other channels of the second terminal.

Thus, one of the electronic devices can communicate (perform transmission/reception, transmission, or reception) with other electronic devices in daisy chain connection.

In the present technique, for example, an endpoint terminal for connecting specific channels may be connected to the first terminal or the second terminal, to which the cable is unconnected, on the electronic devices on both ends among the plurality of electronic devices in daisy chain connection. Thus, the number of communication circuits can be reduced in each of the electronic devices.

Another concept of the present technique is represented by a transmission system configured with

- a plurality of electronic devices in daisy chain connection to a specific device via cables,
- wherein the electronic device includes
- a first terminal and a second terminal for daisy chain connection,
- the first terminal and the second terminal each have a plurality of channels, and
- some of the channels of the first terminal are shifted and directly connected to some of the channels of the second terminal in the device.

In the present technique, the plurality of electronic devices are configured in daisy chain connection to the specific device via cables, and the electronic device includes the first terminal and the second terminal for daisy chain connection. In this configuration, the first terminal and the second terminal each have a plurality of channels, and some of the channels of the first terminal are shifted and directly connected to some of the channels of the second terminal in the device.

As described above, in the present technique, some of the channels of the first terminal are shifted and directly connected to some of the channels of the second terminal in the electronic device. This can properly make a signal connection between the electronic devices to make a daisy chain connection. Furthermore, even if another electronic device is present between the electronic devices to make a signal connection and the electronic devices are turned off, a signal connection can be made without causing any problems.

In the present technique, for example, communication circuits may be connected to other channels of the first terminal and other channels of the second terminal.

Thus, one of the electronic devices can communicate (perform transmission/reception, transmission, or reception) with a specific device or other electronic devices in daisy chain connection.

In the present technique, for example, an endpoint terminal for connecting specific channels may be connected to the second terminal, to which the cable is unconnected, on the electronic device on an end opposite to the specific device of the plurality of electronic devices in daisy chain connection. Thus, the number of communication circuits can be reduced in each of the electronic devices.

BRIEF DESCRIPTION OF DRAWINGS

FIG. 2 illustrates another example of a transmission system including a plurality of electronic devices in daisy chain connection via cables.

FIG. 12 shows the correspondence relationship among the number of electronic devices (the number of connected devices), the number of optical cables (the number of cables), the number of terminals (the number of device terminals), the number of transmit/receive circuits (the number of Tx/Rx), and the number of terminal channels (the number of Ch/cables).

FIG. 27 shows the correspondence relationship among the number of electronic devices (the number of connected devices), the number of optical cables (the number of cables), the number of terminals (the number of device terminals), the number of transmit/receive circuits (the number of Tx/Rx), and the number of terminal channels (the number of Ch/cables).

DESCRIPTION OF EMBODIMENTS

Modes for carrying out the present invention (hereinafter referred to as "embodiments") will be described hereinafter. The descriptions will be given in the following order.

1. Embodiment
2. Modification Example

1. Embodiment

[Description of Related Technique]

Figure 1:
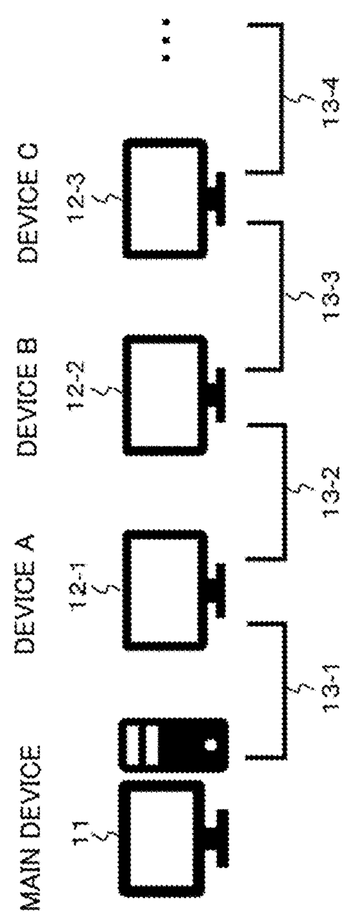
FIG. 1 illustrates an example of a transmission system including a plurality of electronic devices in daisy chain connection via cables.

FIG. 1 illustrates an example of a transmission system including a plurality of electronic devices in daisy chain connection via cables. In this example, an electronic device 12-1 (device A), an electronic device 12-2 (device B), an electronic device 12-3 (device C) . . . are connected in this order like a string via an optical cable 13-1, an optical cable 3-2, an optical cable 13-3, an optical cable 13-4, . . . to a main device 11. In this daisy connection, if one of the electronic devices is connected to the main-output electronic device, other electronic devices can obtain signals through the adjacent electronic devices without being directly connected to the main-output electronic device.

Figure 2:
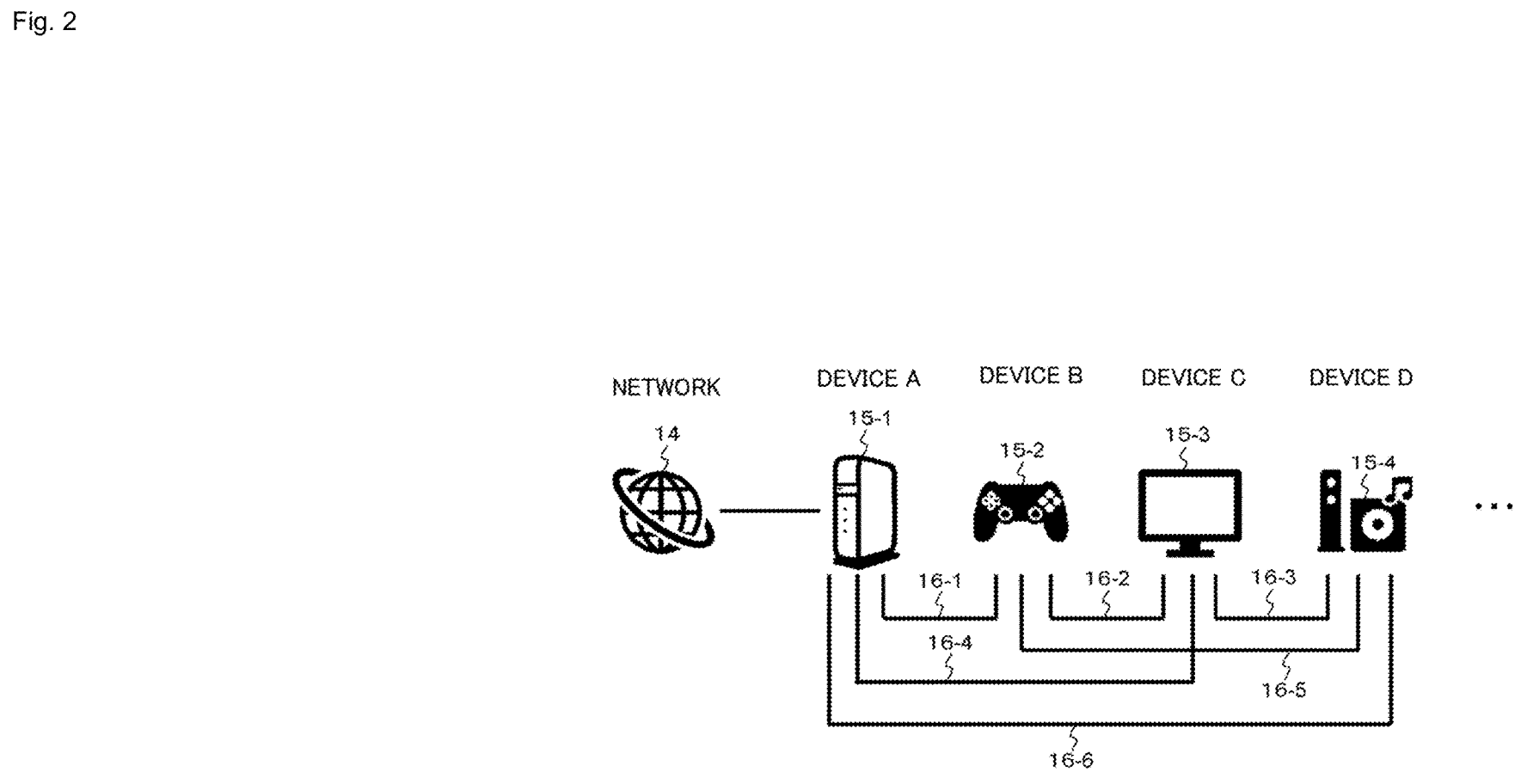

FIG. 2 illustrates another example of a transmission system including a plurality of electronic devices in daisy chain connection via cables. In this example, an electronic device 15-2 (device B), an electronic device 15-3 (device C), an electronic device 15-4 (device D) . . . are connected in this order like a string via optical cables 16-1, 16-2, 16-3, . . . to an electronic device 15-1 (device A) connected to a network 14.

In this case, the electronic device 15-1 (device A) and the electronic device 15-3 (device C) are connected to each other via an optical cable 16-4, the electronic device 15-2 (device B) and the electronic device 15-4 (device D) are connected to each other via an optical cable 16-5, and the electronic device 15-1 (device A) and the electronic device 15-4 (device D) are connected to each other via an optical cable 16-6. This enables signal connection between the connected electronic devices. In this case, a large number of optical cables are used for the connection with complicated wiring between terminals, requiring quite complicated work.

Figure 3:
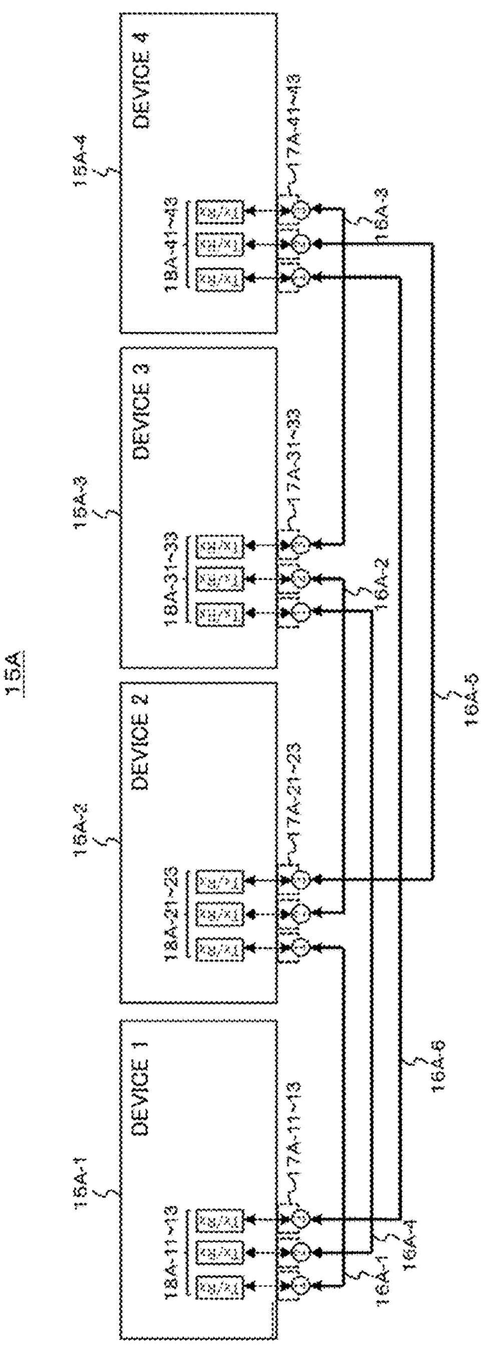
FIG. 3 illustrates an example of a transmission system that can make signal connections among four devices.

FIG. 3 illustrates an example of a transmission system 15A that can make signal connections among four devices. The transmission system 15A is configured such that four electronic devices 15A-1 to 15A-4 are connected to one another.

The electronic device 15A-1 (device 1) is provided with three terminals 17A-11 to 17A-13 to which transmit/receive circuits 18A-11 to 18A-13 are respectively connected. The electronic device 15A-2 (device 2) is provided with three terminals 17A-21 to 17A-23 to which transmit/receive circuits 18A-21 to 18A-23 are respectively connected. The electronic device 15A-3 (device 3) is provided with three terminals 17A-31 to 17A-33 to which transmit/receive circuits 18A-31 to 18A-33 are respectively connected. Furthermore, the electronic device 15A-4 (device 4) is provided with three terminals 17A-41 to 17A-43 to which transmit/receive circuits 18A-41 to 18A-43 are respectively connected.

Moreover, the terminal 17A-11 of the electronic device 15A-1 is connected to the terminal 17A-21 of the electronic device 15A-2 via an optical cable 16A-1, the terminal 17A-22 of the electronic device 15A-2 is connected to the terminal 17A-32 of the electronic device 15A-3 via an optical cable 16A-2, and the terminal 17A-33 of the electronic device 15A-3 is connected to the terminal 17A-43 of the electronic device 15A-4 via an optical cable 16A-3.

Moreover, the terminal 17A-12 of the electronic device 15A-1 is connected to the terminal 17A-31 of the electronic device 15A-3 via an optical cable 16A-4, the terminal 17A-23 of the electronic device 15A-2 is connected to the terminal 17A-42 of the electronic device 15A-4 via an optical cable 16A-5, and the terminal 17A-13 of the electronic device 15A-1 is connected to the terminal 17A-41 of the electronic device 15A-4 via an optical cable 16A-6.

In this case, the transmit/receive circuit 18A-11 of the electronic device 15A-1 is connected to the transmit/receive circuit 18A-21 of the electronic device 15A-2 via a path including the terminal 17A-11, the optical cable 16A-1, and the terminal 17A-21. Moreover, the transmit/receive circuit 18A-22 of the electronic device 15A-2 is connected to the transmit/receive circuit 18A-32 of the electronic device 15A-3 via a path including the terminal 17A-22, the optical cable 16A-2, and the terminal 17A-32. Furthermore, the transmit/receive circuit 18A-33 of the electronic device 15A-3 is connected to the transmit/receive circuit 18A-43 of the electronic device 15A-4 via a path including the terminal 17A-33, the optical cable 16A-3, and the terminal 17A-43.

Additionally, the transmit/receive circuit 18A-12 of the electronic device 15A-1 is connected to the transmit/receive circuit 18A-31 of the electronic device 15A-3 via a path including the terminal 17A-12, the optical cable 16A-4, and the terminal 17A-31. Moreover, the transmit/receive circuit 18A-23 of the electronic device 15A-2 is connected to the transmit/receive circuit 18A-42 of the electronic device 15A-4 via a path including the terminal 17A-23, the optical cable 16A-5, and the terminal 17A-42. Furthermore, the transmit/receive circuit 18A-13 of the electronic device 15A-1 is connected to the transmit/receive circuit 18A-41 of the electronic device 15A-4 via a path including the terminal 17A-13, the optical cable 16A-6, and the terminal 17A-41. This enables signal connection among the connected electronic devices 15A-1 to 15A-4.

In the case of the transmission system 15A in FIG. 3, in order to make signal connections among the devices, the connections to the devices need the individual optical cables. Thus, as described above, one of the devices is provided with the three separate terminals to make connections to the other three devices. Hence, the six optical cables 16A-1 to 16A-6 are used to implement signal connection among the devices. In this case, a large number of optical cables are used and the devices are provided with a large number terminals, that is, 12 terminals in total. This leads to difficulty in recognizing the terminals to be connected, resulting in a complicated connection that may cause an improper connection.

Figure 4:
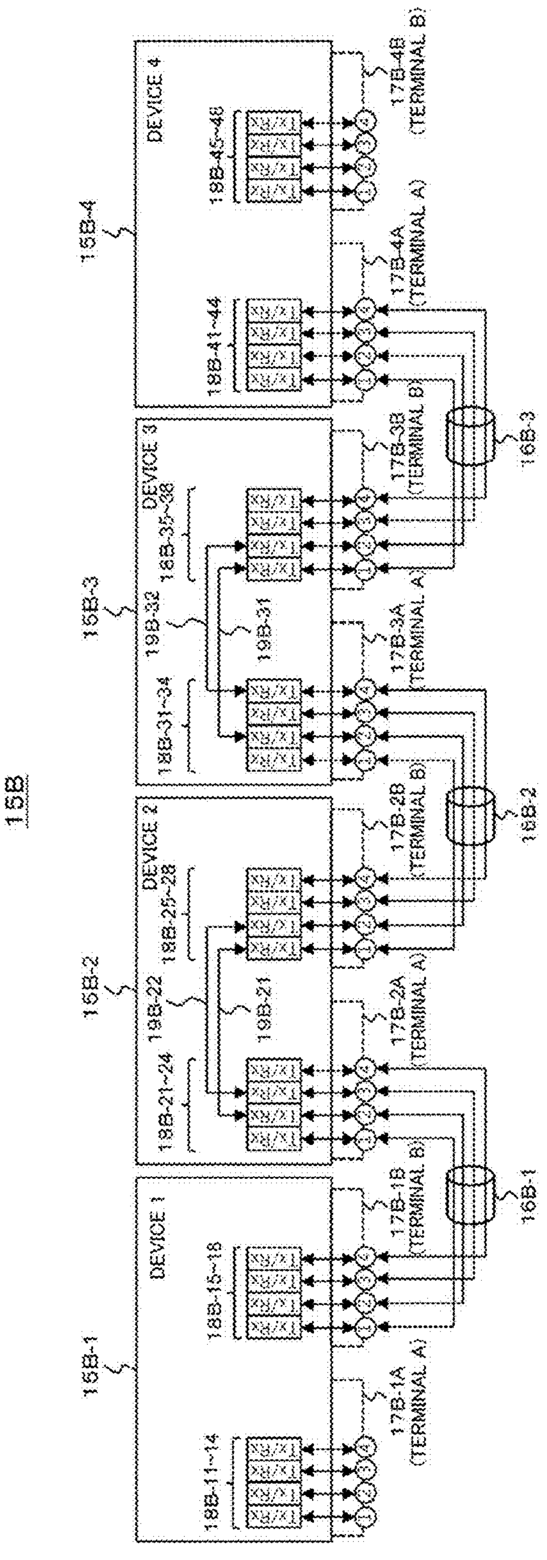
FIG. 4 illustrates an example of a transmission system that can make a simple connection with a small number of optical cables while securing signal connections among devices.

FIG. 4 illustrates an example of a transmission system 15B that can make a simple connection with a small number of optical cables while securing signal connections among devices. The transmission system 15B is also configured such that four electronic devices 15B-1 to 15B-4 are connected to one another.

The electronic device 15B-1 (device 1) is provided with a terminal 17B-1A (terminal A) and a terminal 17B-1B (terminal B) for daisy chain connection. The terminals 17B-1A and 17B-1B each have four channels: channels 1 to 4. Moreover, transmit/receive circuits 18B-11 to 18B-14 are respectively connected to the channels 1 to 4 of the terminal 17B-1A. Furthermore, transmit/receive circuits 18B-15 to 18B-18 are respectively connected to the channels 1 to 4 of the terminal 17B-1B.

The electronic device 15B-2 (device 2) is provided with a terminal 17B-2A (terminal A) and a terminal 17B-2B (terminal B) for daisy chain connection. The terminals 17B-2A and 17B-2B each have four channels: channels 1 to 4. Moreover, transmit/receive circuits 18B-21 to 18B-24 are respectively connected to the channels 1 to 4 of the terminal 17B-2A. Furthermore, transmit/receive circuits 18B-25 to 18B-28 are respectively connected to the channels 1 to 4 of the terminal 17B-2B. The transmit/receive circuits 18B-22 and 18B-23 are respectively connected to the transmit/receive circuits 18B-25 and 18B-26 via internal electric connections 19B-21 and 19B-22.

The electronic device 15B-3 (device 3) is provided with a terminal 17B-3A (terminal A) and a terminal 17B-3B (terminal B) for daisy chain connection. The terminals 17B-3A and 17B-3B each have four channels: channels 1 to 4. Moreover, transmit/receive circuits 18B-31 to 18B-34 are respectively connected to the channels 1 to 4 of the terminal 17B-3A. Furthermore, transmit/receive circuits 18B-35 to 18B-38 are respectively connected to the channels 1 to 4 of the terminal 17B-3B. The transmit/receive circuits 18B-32 and 18B-34 are respectively connected to the transmit/receive circuits 18B-35 and 18B-36 via internal electric connections 19B-31 and 19B-32.

The electronic device 15B-4 (device 4) is provided with a terminal 17B-4A (terminal A) and a terminal 17B-4B (terminal B) for daisy chain connection. The terminals 17B-4A and 17B-4B each have four channels: channels 1 to 4. Moreover, transmit/receive circuits 18B-41 to 18B-44 are respectively connected to the channels 1 to 4 of the terminal 17B-4A. Furthermore, transmit/receive circuits 18B-45 to 18B-48 are respectively connected to the channels 1 to 4 of the terminal 17B-4B.

Moreover, the channels 1 to 4 of the terminal 17B-1B of the electronic device 15B-1 are respectively connected to the channels 1 to 4 of the terminal 17B-2A of the electronic device 15B-2 via a four-core optical cable 16B-1. Furthermore, the channels 1 to 4 of the terminal 17B-2B of the electronic device 15B-2 are respectively connected to the channels 1 to 4 of the terminal 17B-3A of the electronic device 15B-3 via a four-core optical cable 16B-2. Additionally, the channels 1 to 4 of the terminal 17B-3B of the electronic device 15B-3 are respectively connected to the channels 1 to 4 of the terminal 17B-4A of the electronic device 15B-4 via a four-core optical cable 16B-3.

In this case, the transmit/receive circuit 18B-15 of the electronic device 15B-1 is connected to the transmit/receive circuit 18B-21 of the electronic device 15B-2 via a path including the channel 1 of the terminal 17B-1B, the optical cable 16B-1, and the channel 1 of the terminal 17B-2A.

The transmit/receive circuit 18B-16 of the electronic device 15B-1 is connected to the transmit/receive circuit 18B-31 of the electronic device 15B-3 via a path including the channel 2 of the terminal 17B-1B, the optical cable 16B-1, the channel 2 of the terminal 17B-2A, the transmit/receive circuit 18B-22, the internal electric connection 19B-21, the transmit/receive circuit 18B-25, the channel 1 of the terminal 17B-2B, the optical cable 16B-2, and the channel 1 of the terminal 17B-3A.

The transmit/receive circuit 18B-17 of the electronic device 15B-1 is connected to the transmit/receive circuit 18B-41 of the electronic device 15B-4 via a path including the channel 3 of the terminal 17B-1B, the optical cable 16B-1, the channel 3 of the terminal 17B-2A, the transmit/receive circuit 18B-23, the internal electric connection 19B-22, the transmit/receive circuit 18B-26, the channel 2 of the terminal 17B-2B, the optical cable 16B-2, the channel 2 of the terminal 17B-3A, the transmit/receive circuit 18B-32, the internal electric connection 19B-31, the transmit/receive circuit 18B-35, the channel 1 of the terminal 17B-3B, the optical cable 16B-3, and the channel 1 of the terminal 17B-4A.

Furthermore, the transmit/receive circuit 18B-27 of the electronic device 15B-2 is connected to the transmit/receive circuit 18B-33 of the electronic device 15B-3 via a path including the channel 3 of the terminal 17B-2B, the optical cable 16B-2, and the channel 3 of the terminal 17B-3A.

The transmit/receive circuit 18B-28 of the electronic device 15B-2 is connected to the transmit/receive circuit 18B-42 of the electronic device 15B-4 via a path including the channel 4 of the terminal 17B-2B, the optical cable 16B-2, the channel 4 of the terminal 17B-3A, the transmit/receive circuit 18B-34, the internal electric connection 19B-32, the transmit/receive circuit 18B-36, the channel 2 of the terminal 17B-3B, the optical cable 16B-3, and the channel 2 of the terminal 17B-4A.

Furthermore, the transmit/receive circuit 18B-37 of the electronic device 15B-3 is connected to the transmit/receive circuit 18B-43 of the electronic device 15B-4 via a path including the channel 3 of the terminal 17B-3B, the optical cable 16B-3, and the channel 3 of the terminal 17B-4A. This enables signal connection among the electronic devices 15B-1 to 15B-4.

In the case of the transmission system 15B in FIG. 4, the devices can be easily connected via the three optical cables while securing signal connection among the devices. However, for example, in order to connect the electronic device 15B-1 (device 1) and the electronic device 15B-4 (device 4), the electronic device 15B-2 (device 2) and the electronic device 15B-3 (device 3) need to be turned on to always operate even when the electronic devices 15B-2 and 15B-3 are not used. In other words, in the presence of an additional electronic device between the electronic devices to make signal connection in the transmission system 15B in FIG. 4, the additional electronic device needs to be turned on to operate even when the electronic device is not used.

First Embodiment

Figure 5:
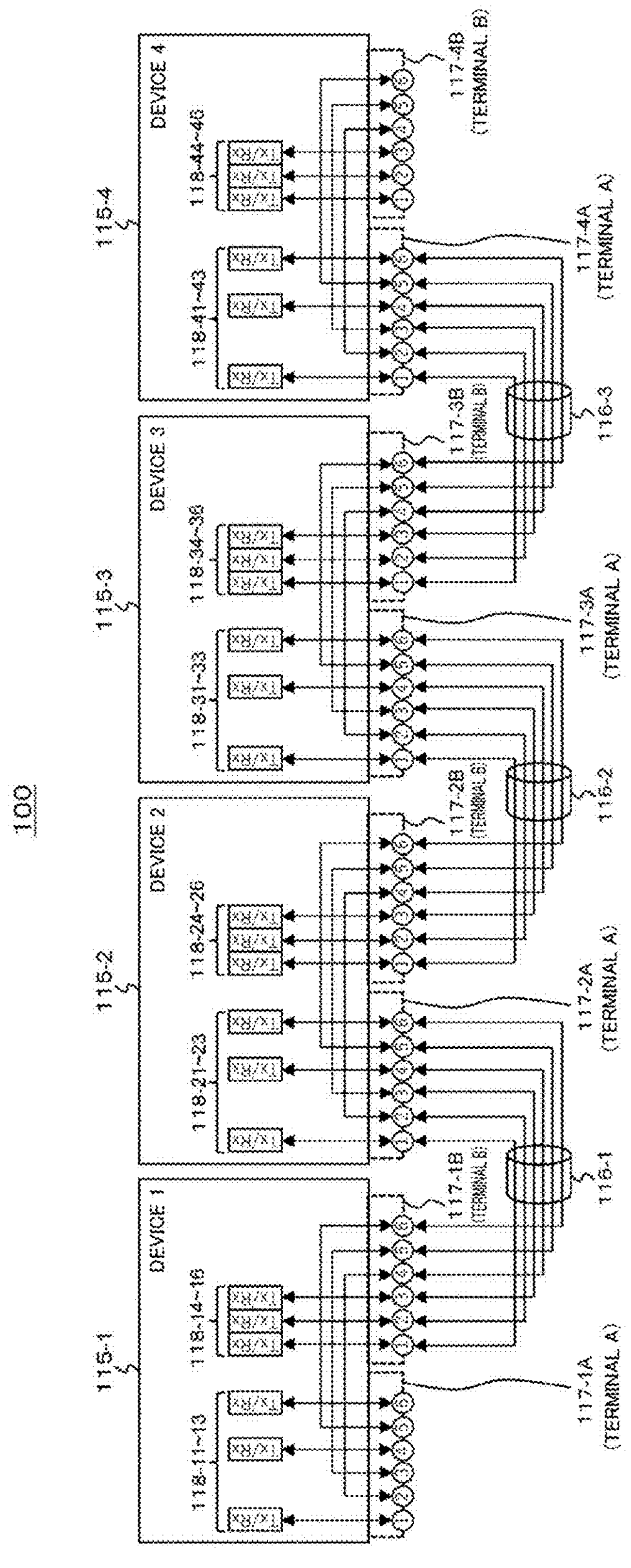
FIG. 5 illustrates a configuration example of a transmission system as a first embodiment.

FIG. 5 illustrates a configuration example of a transmission system 100 as a first embodiment. The transmission system 100 is configured with four electronic devices 115-1 to 115-4 in daisy chain connection. In this example, the electronic devices 115-1 to 115-4 each constitute a transmitter-receiver.

The electronic device 115-1 (device 1) is provided with a terminal 117-1A (terminal A) and a terminal 117-1B (terminal B) for daisy chain connection. The terminals 117-1A and 117-1B each have six channels: channels 1 to 6. In the device, some of the channels of the terminal 117-1A are shifted and directly connected to some of the channels of the terminal 117-1B via optical fibers. Transmit/receive circuits (Tx/Rx) are connected to other channels of the terminal 117-1A and other channels of the terminal 117-1B.

In this configuration, the channels 2, 3, and 5 of the terminal 117-1A are directly connected respectively to the channels 4, 5, and 6 of the terminal 117-1B.

Furthermore, transmit/receive circuits 118-11 to 118-13 are respectively connected to the channels 1, 4, and 6 of the terminal 117-1A, and transmit/receive circuits 118-14 to 118-16 are respectively connected to the channels 1, 2, and 3 of the terminal 117-1B.

The electronic device 115-2 (device 2) is provided with a terminal 117-2A (terminal A) and a terminal 117-2B (terminal B) for daisy chain connection. The terminals 117-2A and 117-2B each have six channels: channels 1 to 6. In the device, some of the channels of the terminal 117-2A are shifted and directly connected to some of the channels of the terminal 117-2B via optical fibers. Transmit/receive circuits are connected to other channels of the terminal 117-2A and other channels of the terminal 117-2B.

In this configuration, the channels 2, 3, and 5 of the terminal 117-2A are directly connected respectively to the channels 4, 5, and 6 of the terminal 117-2B.

Furthermore, transmit/receive circuits 118-21 to 118-23 are respectively connected to the channels 1, 4, and 6 of the terminal 117-2A, and transmit/receive circuits 118-24 to 118-26 are respectively connected to the channels 1, 2, and 3 of the terminal 117-2B.

The electronic device 115-3 (device 3) is provided with a terminal 117-3A (terminal A) and a terminal 117-3B (terminal B) for daisy chain connection. The terminals 117-3A and 117-3B each have six channels: channels 1 to 6. In the device, some of the channels of the terminal 117-3A are shifted and directly connected to some of the channels of the terminal 117-3B via optical fibers. Transmit/receive circuits are connected to other channels of the terminal 117-3A and other channels of the terminal 117-3B.

In this configuration, the channels 2, 3, and 5 of the terminal 117-3A are directly connected respectively to the channels 4, 5, and 6 of the terminal 117-3B.

Furthermore, transmit/receive circuits 118-31 to 118-33 are respectively connected to the channels 1, 4, and 6 of the terminal 117-3A, and transmit/receive circuits 118-34 to 118-36 are respectively connected to the channels 1, 2, and 3 of the terminal 117-3B.

The electronic device 115-4 (device 4) is provided with a terminal 117-4A (terminal A) and a terminal 117-4B (terminal B) for daisy chain connection. The terminals 117-4A and 117-4B each have six channels: channels 1 to 6. In the device, some of the channels of the terminal 117-4A are shifted and directly connected to some of the channels of the terminal 117-4B via optical fibers. Transmit/receive circuits are connected to other channels of the terminal 117-4A and other channels of the terminal 117-4B.

In this configuration, the channels 2, 3, and 5 of the terminal 117-4A are directly connected respectively to the channels 4, 5, and 6 of the terminal 117-4B.

Furthermore, transmit/receive circuits 118-41 to 118-43 are respectively connected to the channels 1, 4, and 6 of the terminal 117-4A, and transmit/receive circuits 118-44 to 118-46 are respectively connected to the channels 1, 2, and 3 of the terminal 117-4B.

Moreover, the channels 1 to 6 of the terminal 117-1B of the electronic device 115-1 are respectively connected to the channels 1 to 6 of the terminal 117-2A of the electronic device 115-2 via a six-core optical cable 116-1. Furthermore, the channels 1 to 6 of the terminal 117-2B of the electronic device 115-2 are respectively connected to the channels 1 to 6 of the terminal 117-3A of the electronic device 115-3 via a six-core optical cable 116-2. Moreover, the channels 1 to 6 of the terminal 117-3B of the electronic device 115-3 are respectively connected to the channels 1 to 6 of the terminal 117-4A of the electronic device 115-4 via a six-core optical cable 116-3.

In this case, the transmit/receive circuit 118-14 of the electronic device 115-1 is connected to the transmit/receive circuit 118-21 of the electronic device 115-2 via a path including the channel 1 of the terminal 117-1B, the optical cable 116-1, and the channel 1 of the terminal 117-2A.

The transmit/receive circuit 118-15 of the electronic device 115-1 is connected to the transmit/receive circuit 118-32 of the electronic device 115-3 via a path including the channel 2 of the terminal 117-1B, the optical cable 116-1, the channel 2 of the terminal 117-2A, the optical fiber (internal wiring), the channel 4 of the terminal 117-2B, the optical cable 116-2, and the channel 4 of the terminal 117-3A.

The transmit/receive circuit 118-16 of the electronic device 115-1 is connected to the transmit/receive circuit 118-43 of the electronic device 115-4 via a path including the channel 3 of the terminal 117-1B, the optical cable 116-1, the channel 3 of the terminal 117-2A, the optical fiber (internal wiring), the channel 5 of the terminal 117-2B, the optical cable 116-2, the channel 5 of the terminal 117-3A, the optical fiber (internal wiring), the channel 6 of the terminal 117-3B, the optical cable 116-3, and the channel 6 of the terminal 117-4A.

Furthermore, the transmit/receive circuit 118-24 of the electronic device 115-2 is connected to the transmit/receive circuit 118-31 of the electronic device 115-3 via a path including the channel 1 of the terminal 117-2B, the optical cable 116-2, and the channel 1 of the terminal 117-3A.

The transmit/receive circuit 118-25 of the electronic device 115-2 is connected to the transmit/receive circuit 118-42 of the electronic device 115-4 via a path including the channel 2 of the terminal 117-2B, the optical cable 116-2, the channel 2 of the terminal 117-3A, the optical fiber (internal wiring), the channel 4 of the terminal 117-3B, the optical cable 116-3, and the channel 4 of the terminal 117-4A.

Furthermore, the transmit/receive circuit 118-34 of the electronic device 115-3 is connected to the transmit/receive circuit 118-41 of the electronic device 115-4 via a path including the channel 1 of the terminal 117-3B, the optical cable 116-3, and the channel 1 of the terminal 117-4A.

Hereinafter, the assignment of the transmit/receive circuits to the electronic devices in the transmission system 100 in FIG. 5 will be discussed. For example, in the electronic device 115-1 (device 1), the channels 1, 4, and 6 of the terminal 117-1A (terminal A) are all unconnected, the channel 1 of the terminal 117-1B (terminal B) is connected to the electronic device 115-2 (device 2), the channel 2 of the terminal 117-1B is connected to the electronic device 115-3 (device 3), and the channel 3 of the terminal 117-1B is connected to the electronic device 115-4 (device 4).

For example, in the electronic device 115-2 (device 2), the channel 1 of the terminal 117-2A (terminal A) is connected to the electronic device 115-1 (device 1), the channels 4 and 6 of the terminal 117-2A are unconnected, the channel 1 of the terminal 117-2B (terminal B) is connected to the electronic device 115-3 (device 3), the channel 2 is connected to the electronic device 115-4 (device 4), and the channel 3 is unconnected.

As described above, the connection destinations of the transmit/receive circuits are changed depending upon the order of connection of the electronic devices. Thus, the transmit/receive circuits to connect, the transmit/receive circuits to be connected, and the electronic devices including the transmit/receive circuits need to be identified in advance.

Figure 6:
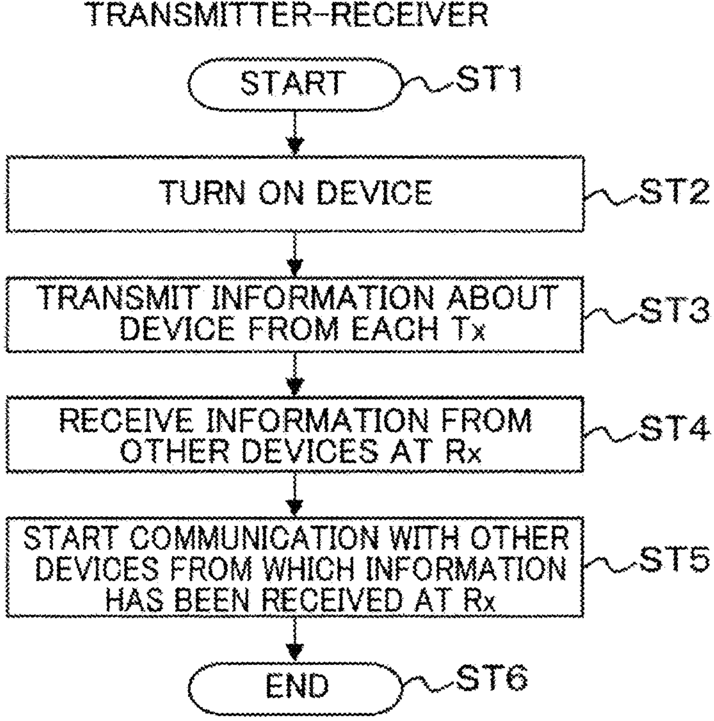
FIG. 6 is a flowchart showing an example of a procedure before communications with other devices are started in the electronic device (transmitter-receiver).

The flowchart of FIG. 6 shows an example of a procedure before communications with other devices are started in the electronic devices (electronic devices 115-1 to 115-4).

First, in step ST1, the electronic device 115 starts processing. In step ST2, the electronic device 115 turns on the power supply of the device. In step ST3, the electronic device 115 then transmits information about the device from the transmitting units (Tx) of the transmit/receive circuits. The information about the device includes address information (e.g., "xxxx") and label information (e.g., "a 4K television in a living room").

In step ST4, the electronic device 115 then receives, at receiving units (Rx), information from other devices. In step ST5, the electronic device 115 then starts communications with other devices, from which the information has been received at the receiving units (Rx). In step ST6, the electronic device 115 terminates the processing. Thus, the electronic device 115 can start communications after identifying the transmit/receive circuits to connect and the electronic devices to be connected.

Figure 7:
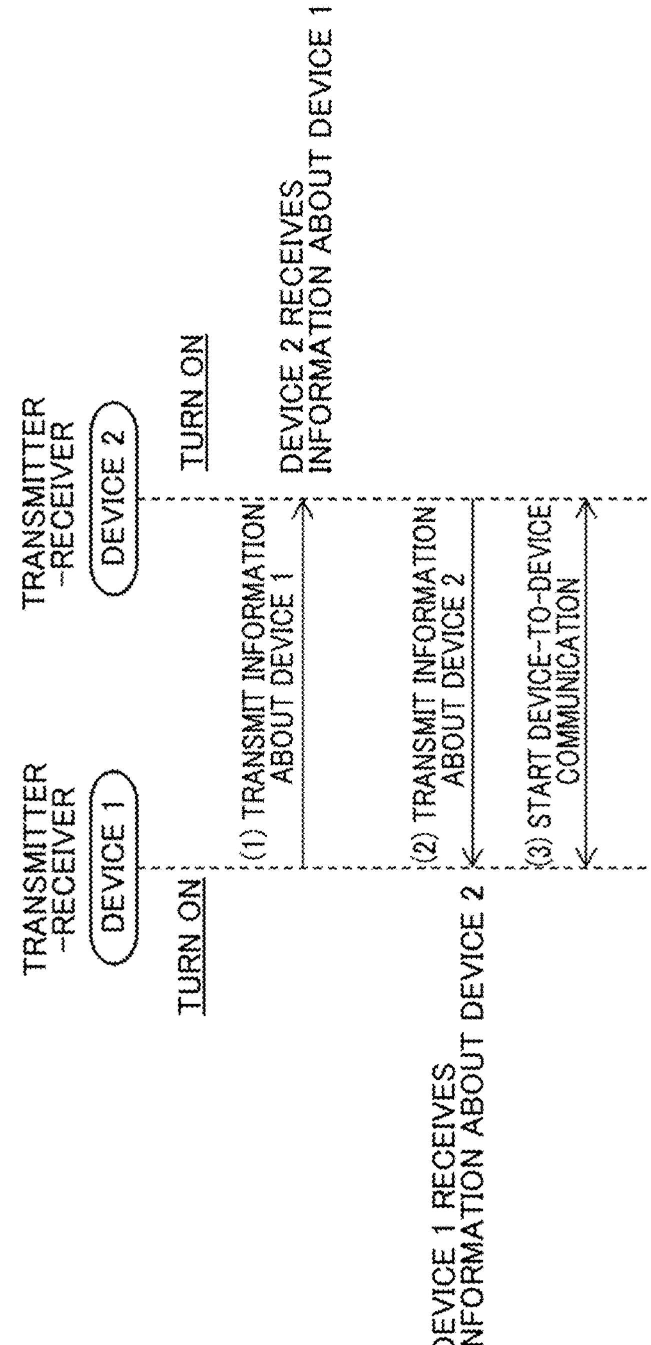
FIG. 7 is a sequence diagram showing an example of exchange of information before device-to-device communications are started between the device 1 and the device 2.

The sequence diagram of FIG. 7 shows an example of exchange of information before device-to-device communications are started between the device 1 and the device 2, in the flowchart of FIG. 6 showing the procedure before each device starts communications with other devices. The sequence diagram is intended to represent the case where the device 1 and the device 2 are turned on at the same time. Moreover, information is similarly exchanged before device-to-device communications between other devices are started. A detailed description thereof is omitted.

(1) First, the device 1 transmits information about the device 1 (device) to the device 2 after being turned on. The device 2 receives the information about the device 1.

(2) The device 2 then transmits information about the device 2 (device) to the device 1. The device 1 receives the information about the device 2. (3) The device 1 and the device 2 then start device-to-device communications.

Figure 8:
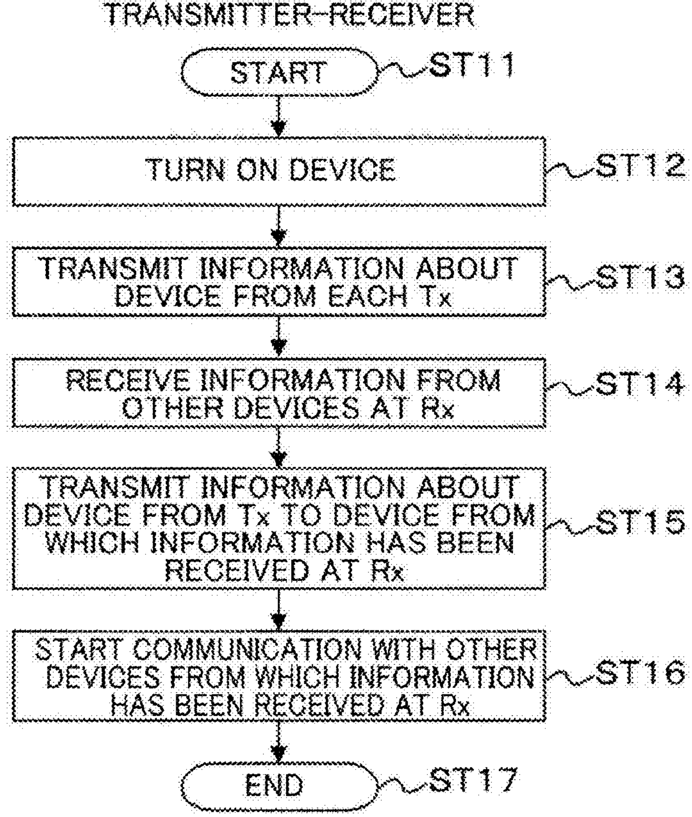
FIG. 8 is a flowchart showing an example of a procedure before communications with other devices are started in the electronic device (transmitter-receiver).

The flowchart of FIG. 8 shows another example of a procedure before communications with other devices are started in the electronic devices 115 (electronic devices 115-1 to 115-4). In this example, even if the other devices are turned on after the device, device-to-device communications can be started after information about the other devices is received.

First, in step ST11, the electronic device 115 starts processing. In step ST12, the electronic device 115 turns on the power supply of the device. In step ST13, the electronic device 115 then transmits information about the device from the transmitting units (Tx) of the transmit/receive circuits. The information about the device includes address information (e.g., "xxxx") and label information (e.g., "a 4K television in a living room").

In step ST14, the electronic device 115 then receives, at the receiving units (Rx), information from other devices. In step ST15, the electronic device 115 then transmits the information about the device from transmitting units (Tx) to the devices, from which the information has been received at the receiving units (Rx). In step ST16, the electronic device 115 then starts communications with other devices, from which the information has been received at the receiving units (Rx). In step ST7, the electronic device 115 terminates the processing. Thus, each electronic device 115 can start communications after identifying the transmit/receive circuits to connect and the electronic devices to be connected.

Figure 9:
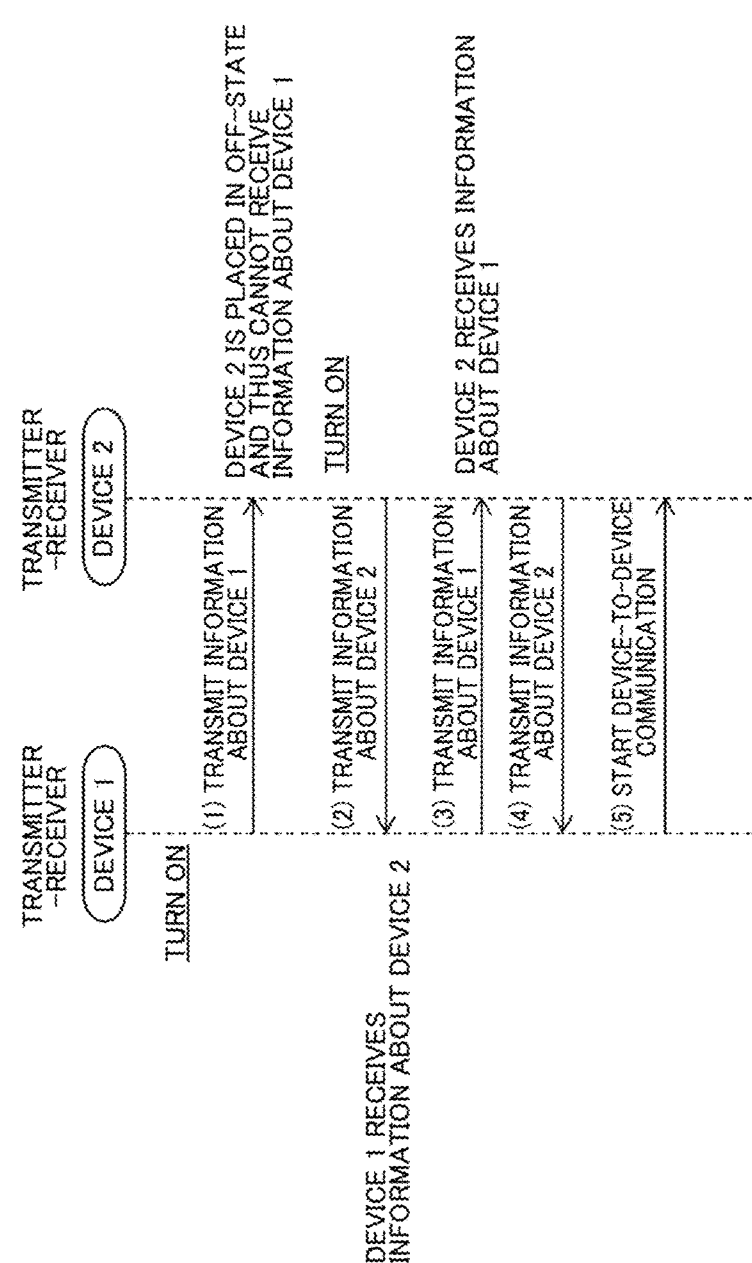
FIG. 9 is a sequence diagram showing an example of exchange of information before device-to-device communications are started between the device 1 and the device 2.

The sequence diagram of FIG. 9 shows an example of exchange of information before device-to-device communications are started between the device 1 and the device 2, in the flowchart of FIG. 7 showing the procedure before each device starts communications with other devices. The sequence diagram is intended to represent the case where the device 2 is turned on after the device 1 is turned on. Moreover, information is similarly exchanged before device-to-device communications between other devices are started. A detailed description thereof is omitted.

(1) First, the device 1 transmits information about the device 1 (device) to the device 2 after being turned on. However, the device 2 is placed in an off-state and thus cannot receive the information about the device 1. Thereafter, the device 2 is turned on. (2) The device 2 then transmits information about the device 2 (device) to the device 1 after being turned on. The device 1 receives the information about the device 2.

(3) The device 1 then transmits information about the device 1 (device) to the device 2 when receiving the information about the device 2. The device 2 receives the information about the device 1. (4) The device 2 then transmits information about the device (device) 2 to the device 1 when receiving the information about the device 1. (5) The device 1 and the device 2 then start device-to-device communications.

In the transmission system 100 in FIG. 5, some of the channels of the terminal A are shifted and directly connected to some of the channels of the terminal B via the optical fibers and the transmit/receive circuits are connected to other channels of the terminal A and other channels of the terminal B in each of the electronic devices. This can properly make a signal connection between the electronic devices to make a daisy chain connection. Furthermore, even if another electronic device is present between the electronic devices to make a signal connection and the electronic devices are turned off, a signal connection can be made without causing any problems. For example, even if the electronic device 115-2 (device 2) and the electronic device 115-3 (device 3) are turned off, a signal connection can be made between the electronic device 115-1 (device 1) and the electronic device 115-4 (device 4).

Second Embodiment

Figure 10:
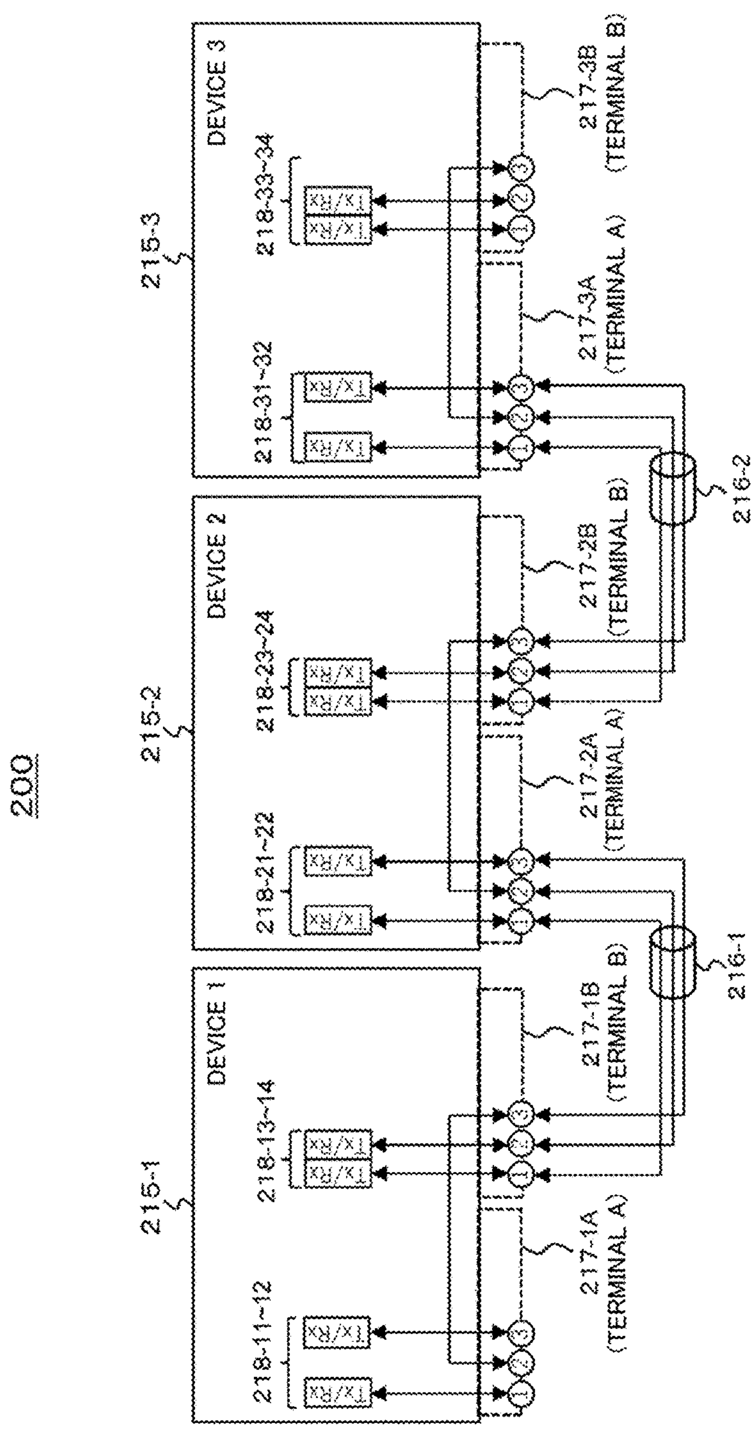
FIG. 10 illustrates a configuration example of a transmission system as a second embodiment.

FIG. 10 illustrates a configuration example of a transmission system 200 as a second embodiment. The transmission system 200 is configured with three electronic devices 215-1 to 215-3 in daisy chain connection. In this example, the electronic devices 215-1 to 215-3 each constitute a transmitter-receiver.

The electronic device 215-1 (device 1) is provided with a terminal 217-1A (terminal A) and a terminal 217-1B (terminal B) for daisy chain connection. The terminals 217-1A and 217-1B each have three channels: channels 1 to 3. In the device, some of the channels of the terminal 217-1A are shifted and directly connected to some of the channels of the terminal 217-1B via optical fibers. Transmit/receive circuits (Tx/Rx) are connected to other channels of the terminal 217-1A and other channels of the terminal 217-1B.

In this configuration, the channel 2 of the terminal 217-1A is directly connected to the channel 3 of the terminal 217-1B. Furthermore, transmit/receive circuits 218-11 and 218-12 are respectively connected to the channels 1 and 3 of the terminal 217-1A, and transmit/receive circuits 218-13 and 218-14 are respectively connected to the channels 1 and 2 of the terminal 217-1B.

The electronic device 215-2 (device 2) is provided with a terminal 217-2A (terminal A) and a terminal 217-2B (terminal B) for daisy chain connection. The terminals 217-2A and 217-2B each have three channels: channels 1 to 3. In the device, some of the channels of the terminal 217-2A are shifted and directly connected to some of the channels of the terminal 217-2B via optical fibers. Transmit/receive circuits are connected to other channels of the terminal 217-2A and other channels of the terminal 217-2B.

In this configuration, the channel 2 of the terminal 217-2A is directly connected to the channel 3 of the terminal 217-2B. Furthermore, transmit/receive circuits 218-21 and 218-22 are respectively connected to the channels 1 and 3 of the terminal 217-2A, and transmit/receive circuits 218-23 and 218-24 are respectively connected to the channels 1 and 2 of the terminal 217-2B.

The electronic device 215-3 (device 3) is provided with a terminal 217-3A (terminal A) and a terminal 217-3B (terminal B) for daisy chain connection. The terminals 217-3A and 217-3B each have three channels: channels 1 to 3. In the device, some of the channels of the terminal 217-3A are shifted and directly connected to some of the channels of the terminal 217-3B via optical fibers. Transmit/receive circuits are connected to other channels of the terminal 217-3A and other channels of the terminal 217-3B.

In this configuration, the channel 2 of the terminal 217-3A is directly connected to the channel 3 of the terminal 217-3B. Furthermore, transmit/receive circuits 218-31 and 218-32 are respectively connected to the channels 1 and 3 of the terminal 217-3A, and transmit/receive circuits 218-33 and 218-34 are respectively connected to the channels 1 and 2 of the terminal 217-3B.

The channels 1 to 3 of the terminal 217-1B of the electronic device 215-1 are respectively connected to the channels 1 to 3 of the terminal 217-2A of the electronic device 215-2 via a three-core optical cable 216-1. The channels 1 to 3 of the terminal 217-2B of the electronic device 215-2 are respectively connected to the channels 1 to 3 of the terminal 217-3A of the electronic device 215-3 via a three-core optical cable 216-2.

In this case, the transmit/receive circuit 218-13 of the electronic device 215-1 is connected to the transmit/receive circuit 218-21 of the electronic device 215-2 via a path including the channel 1 of the terminal 217-1B, the optical cable 216-1, and the channel 1 of the terminal 217-2A.

The transmit/receive circuit 218-14 of the electronic device 215-1 is connected to the transmit/receive circuit 218-32 of the electronic device 215-3 via a path including the channel 2 of the terminal 217-1B, the optical cable 216-1, the channel 2 of the terminal 217-2A, the optical fiber (internal wiring), the channel 3 of the terminal 217-2B, the optical cable 216-2, and the channel 3 of the terminal 217-3A.

Furthermore, the transmit/receive circuit 218-23 of the electronic device 215-2 is connected to the transmit/receive circuit 218-31 of the electronic device 215-3 via a path including the channel 1 of the terminal 217-2B, the optical cable 216-2, and the channel 1 of the terminal 217-3A.

In the transmission system 200 in FIG. 10, as in the transmission system 100 in FIG. 5, some of the channels of the terminal A are shifted and directly connected to some of the channels of the terminal B via the optical fibers and the transmit/receive circuits are connected to other channels of the terminal A and other channels of the terminal B in each of the electronic devices. This can properly make a signal connection between the electronic devices to make a daisy chain connection. Furthermore, even if another electronic device is present between the electronic devices to make a signal connection and the electronic devices are turned off, a signal connection can be made without causing any problems. For example, even if the electronic device 215-2 (device 2) is turned off, a signal connection can be made between the electronic device 215-1 (device 1) and the electronic device 215-3 (device 3).

Before communications with other devices are started in the electronic devices 215 (electronic devices 215-1 to 215-3) constituting the transmission system 200 in FIG. 10, a procedure is similar to that of the electronic devices 115 (electronic devices 115-1 to 115-4) constituting the transmission system 100 in FIG. 5 (see the flowcharts of FIGS. 6 and 8). The detailed description of the procedure is omitted.

Third Embodiment

Figure 11:
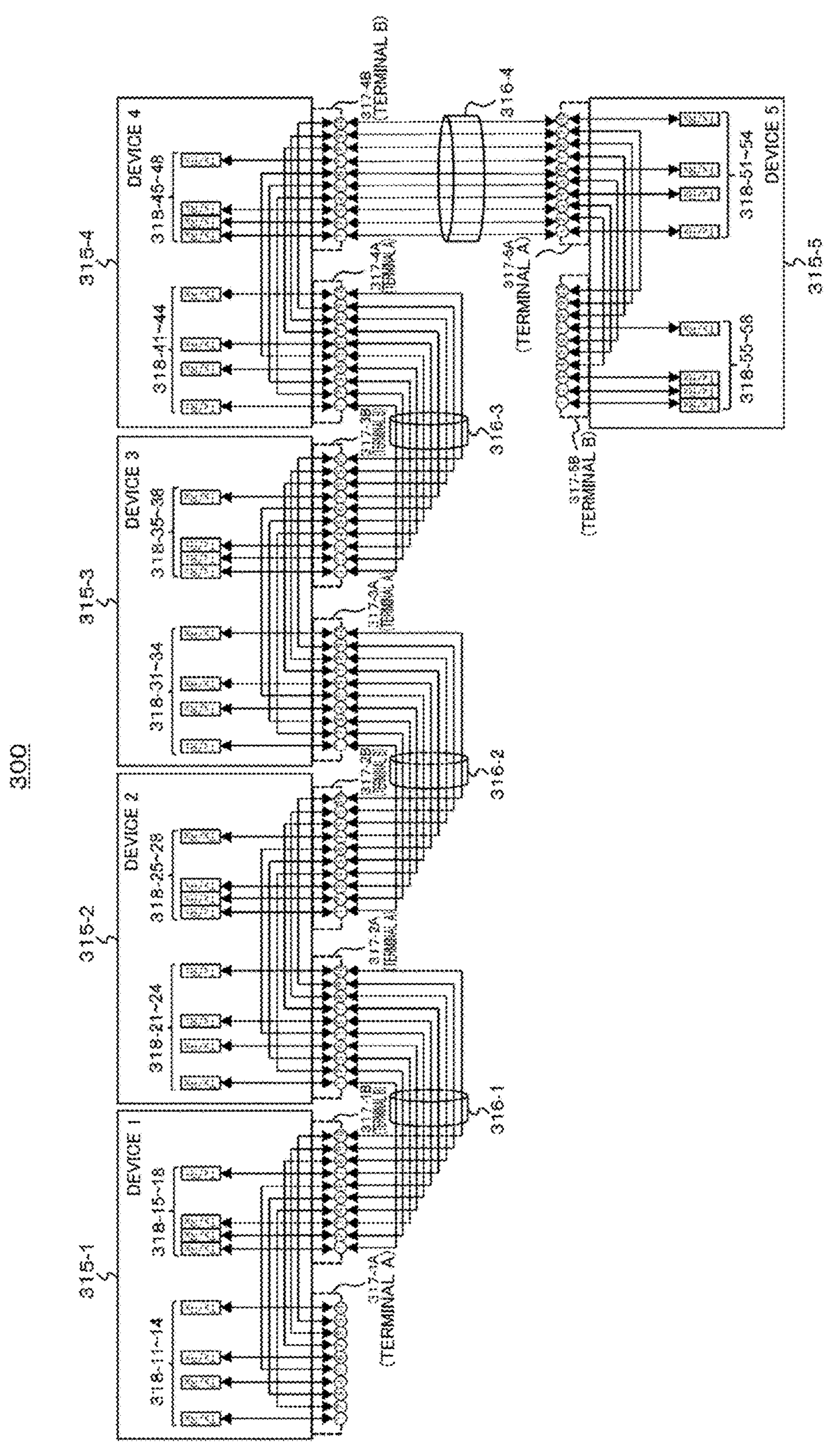
FIG. 11 illustrates a configuration example of a transmission system as a third embodiment.

FIG. 11 illustrates a configuration example of a transmission system 300 as a third embodiment. The transmission system 300 is configured with five electronic devices 315-1 to 315-5 in daisy chain connection. In this example, the electronic devices 315-1 to 315-5 each constitute a transmitter-receiver.

The electronic device 315-1 (device 1) is provided with a terminal 317-1A (terminal A) and a terminal 317-1B (terminal B) for daisy chain connection. The terminals 317-1A and 317-1B each have ten channels: channels 1 to 10. In the device, some of the channels of the terminal 317-1A are shifted and directly connected to some of the channels of the terminal 317-1B via optical fibers. Transmit/receive circuits (Tx/Rx) are connected to other channels of the terminal 317-1A and other channels of the terminal 317-1B.

In this configuration, the channels 2, 3, 5, 7, 8, and 9 of the terminal 317-1A are directly connected respectively to the channels 4, 5, 6, 8, 9, and 10 of the terminal 317-1B. Furthermore, transmit/receive circuits 318-11 to 318-14 are respectively connected to the channels 1, 4, 6, and 10 of the terminal 317-1A, and transmit/receive circuits 318-15 to 318-18 are respectively connected to the channels 1, 2, 3, and 7 of the terminal 317-1B.

The electronic device 315-2 (device 2) is provided with a terminal 317-2A (terminal A) and a terminal 317-2B (terminal B) for daisy chain connection. The terminals 317-2A and 317-2B each have ten channels: channels 1 to 10. In the device, some of the channels of the terminal 317-2A are shifted and directly connected to some of the channels of the terminal 317-2B via optical fibers. Transmit/receive circuits are connected to other channels of the terminal 317-2A and other channels of the terminal 317-2B.

In this configuration, the channels 2, 3, 5, 7, 8, and 9 of the terminal 317-2A are directly connected respectively to the channels 4, 5, 6, 8, 9, and 10 of the terminal 317-2B. Furthermore, transmit/receive circuits 318-21 to 318-24 are respectively connected to the channels 1, 4, 6, and 10 of the terminal 317-2A, and transmit/receive circuits 318-25 to 318-28 are respectively connected to the channels 1, 2, 3, and 7 of the terminal 317-2B.

The electronic device 315-3 (device 3) is provided with a terminal 317-3A (terminal A) and a terminal 317-3B (terminal B) for daisy chain connection. The terminals 317-3A and 317-3B each have ten channels: channels 1 to 10. In the device, some of the channels of the terminal 317-3A are shifted and directly connected to some of the channels of the terminal 317-3B via optical fibers. Transmit/receive circuits are connected to other channels of the terminal 317-3A and other channels of the terminal 317-3B.

In this configuration, the channels 2, 3, 5, 7, 8, and 9 of the terminal 317-3A are directly connected respectively to the channels 4, 5, 6, 8, 9, and 10 of the terminal 317-3B. Furthermore, transmit/receive circuits 318-31 to 318-34 are respectively connected to the channels 1, 4, 6, and 10 of the terminal 317-3A, and transmit/receive circuits 318-35 to 318-38 are respectively connected to the channels 1, 2, 3, and 7 of the terminal 317-3B.

The electronic device 315-4 (device 4) is provided with a terminal 317-4A (terminal A) and a terminal 317-4B (terminal B) for daisy chain connection. The terminals 317-4A and 317-4B each have ten channels: channels 1 to 10. In the device, some of the channels of the terminal 317-4A are shifted and directly connected to some of the channels of the terminal 317-4B via optical fibers. Transmit/receive circuits are connected to other channels of the terminal 317-4A and other channels of the terminal 317-4B.

In this configuration, the channels 2, 3, 5, 7, 8, and 9 of the terminal 317-4A are directly connected respectively to the channels 4, 5, 6, 8, 9, and 10 of the terminal 317-4B. Furthermore, transmit/receive circuits 318-41 to 318-44 are respectively connected to the channels 1, 4, 6, and 10 of the terminal 317-4A, and transmit/receive circuits 318-45 to 318-48 are respectively connected to the channels 1, 2, 3, and 7 of the terminal 317-4B.

The electronic device 315-5 (device 5) is provided with a terminal 317-5A (terminal A) and a terminal 317-5B (terminal B) for daisy chain connection. The terminals 317-5A and 317-5B each have ten channels: channels 1 to 10. In the device, some of the channels of the terminal 317-5A are shifted and directly connected to some of the channels of the terminal 317-5B via optical fibers. Transmit/receive circuits are connected to other channels of the terminal 317-5A and other channels of the terminal 317-5B.

In this configuration, the channels 2, 3, 5, 7, 8, and 9 of the terminal 317-5A are directly connected respectively to the channels 4, 5, 6, 8, 9, and 10 of the terminal 317-5B. Furthermore, transmit/receive circuits 318-51 to 318-54 are respectively connected to the channels 1, 4, 6, and 10 of the terminal 317-5A, and transmit/receive circuits 318-55 to 318-58 are respectively connected to the channels 1, 2, 3, and 7 of the terminal 317-5B.

The channels 1 to 10 of the terminal 317-1B of the electronic device 315-1 are respectively connected to the channels 1 to 10 of the terminal 317-2A of the electronic device 315-2 via a ten-core optical cable 316-1. The channels 1 to 10 of the terminal 317-2B of the electronic device 315-2 are respectively connected to the channels 1 to 10 of the terminal 317-3A of the electronic device 315-3 via a ten-core optical cable 316-2. The channels 1 to 10 of the terminal 317-3B of the electronic device 315-3 are respectively connected to the channels 1 to 10 of the terminal 317-4A of the electronic device 315-4 via a ten-core optical cable 316-3. The channels 1 to 10 of the terminal 317-4B of the electronic device 315-4 are respectively connected to the channels 1 to 10 of the terminal 317-5A of the electronic device 315-5 via a ten-core optical cable 316-4.

In this case, the transmit/receive circuit 318-15 of the electronic device 315-1 is connected to the transmit/receive circuit 318-21 of the electronic device 315-2 via a path including the channel 1 of the terminal 317-1B, the optical cable 316-1, and the channel 1 of the terminal 317-2A.

The transmit/receive circuit 318-16 of the electronic device 315-1 is connected to the transmit/receive circuit 318-32 of the electronic device 315-3 via a path including the channel 2 of the terminal 317-1B, the optical cable 316-1, the channel 2 of the terminal 317-2A, the optical fiber (internal wiring), the channel 4 of the terminal 317-2B, the optical cable 316-2, and the channel 4 of the terminal 317-3A.

The transmit/receive circuit 318-17 of the electronic device 315-1 is connected to the transmit/receive circuit 318-43 of the electronic device 315-4 via a path including the channel 3 of the terminal 317-1B, the optical cable 316-1, the channel 3 of the terminal 317-2A, the optical fiber (internal wiring), the channel 5 of the terminal 317-2B, the optical cable 316-2, the channel 5 of the terminal 317-3A, the optical fiber (internal wiring), the channel 6 of the terminal 317-3B, the optical fiber 316-3, and the channel 6 of the terminal 317-4A.

The transmit/receive circuit 318-18 of the electronic device 315-1 is connected to the transmit/receive circuit 318-54 of the electronic device 315-5 via a path including the channel 7 of the terminal 317-1B, the optical cable 316-1, the channel 7 of the terminal 317-2A, the optical fiber (internal wiring), the channel 8 of the terminal 317-2B, the optical cable 316-2, the channel 8 of the terminal 317-3A, the optical fiber (internal wiring), the channel 9 of the terminal 317-3B, the optical cable 316-3, the channel 9 of the terminal 317-4A, the optical fiber (internal wiring), the channel 10 of the terminal 317-4B, the optical cable 316-4, and the channel 10 of the terminal 317-5A.

Furthermore, the transmit/receive circuit 318-25 of the electronic device 315-2 is connected to the transmit/receive circuit 318-31 of the electronic device 315-3 via a path including the channel 1 of the terminal 317-2B, the optical cable 316-2, and the channel 1 of the terminal 317-3A.

The transmit/receive circuit 318-26 of the electronic device 315-2 is connected to the transmit/receive circuit 318-42 of the electronic device 315-4 via a path including the channel 2 of the terminal 317-2B, the optical cable 316-2, the channel 2 of the terminal 317-3A, the optical fiber (internal wiring), the channel 4 of the terminal 317-3B, the optical cable 316-3, and the channel 4 of the terminal 317-4A.

The transmit/receive circuit 318-27 of the electronic device 315-2 is connected to the transmit/receive circuit 318-53 of the electronic device 315-5 via a path including the channel 3 of the terminal 317-2B, the optical cable 316-2, the channel 3 of the terminal 317-3A, the optical fiber (internal wiring), the channel 5 of the terminal 317-3B, the optical cable 316-3, the channel 5 of the terminal 317-4A, the optical fiber (internal wiring), the channel 6 of the terminal 317-4B, the optical fiber 316-4, and the channel 6 of the terminal 317-5A.

Furthermore, the transmit/receive circuit 318-35 of the electronic device 315-3 is connected to the transmit/receive circuit 318-41 of the electronic device 315-4 via a path including the channel 1 of the terminal 317-3B, the optical cable 316-3, and the channel 1 of the terminal 317-4A.

The transmit/receive circuit 318-36 of the electronic device 315-3 is connected to the transmit/receive circuit 318-52 of the electronic device 315-5 via a path including the channel 2 of the terminal 317-3B, the optical cable 316-3, the channel 2 of the terminal 317-4A, the optical fiber (internal wiring), the channel 4 of the terminal 317-4B, the optical cable 316-4, and the channel 4 of the terminal 317-5A.

Furthermore, the transmit/receive circuit 318-45 of the electronic device 315-4 is connected to the transmit/receive circuit 318-51 of the electronic device 315-5 via a path including the channel 1 of the terminal 317-4B, the optical cable 316-4, and the channel 1 of the terminal 317-5A.

In the transmission system 300 in FIG. 11, as in the transmission system 100 in FIG. 5, some of the channels of the terminal A are shifted and directly connected to some of the channels of the terminal B via the optical fibers and the transmit/receive circuits are connected to other channels of the terminal A and other channels of the terminal B in each of the electronic devices. This can properly make a signal connection between the electronic devices to make a daisy chain connection. Furthermore, even if another electronic device is present between the electronic devices to make a signal connection and the electronic devices are turned off, a signal connection can be made without causing any problems. For example, even if the electronic devices 315-2 (device 2) to 315-4 (device 4) are turned off, a signal connection can be made between the electronic device 315-1 (device 1) and the electronic device 315-5 (device 5).

Before communications with other devices are started in the electronic devices 315 (electronic devices 315-1 to 315-5) constituting the transmission system 300 in FIG. 11, a procedure is similar to that of the electronic devices 115 (electronic devices 115-1 to 115-4) constituting the transmission system 100 in FIG. 5 (see the flowcharts of FIGS. 6 and 8). The detailed description of the procedure is omitted.

As described above, the transmission system 100 in FIG. 5 is configured with the four electronic devices 115-1 to 115-4 in daisy chain connection, the transmission system 200 in FIG. 10 is configured with the three electronic devices 215-1 to 215-3 in daisy chain connection, and the transmission system 300 in FIG. 11 is configured with the five electronic devices 315-1 to 315-5 in daisy chain connection. Other transmission systems for the number of electronic devices can also have similar configurations. A detailed description thereof is omitted.

In the case of three electronic devices, it is assumed that the electronic devices each include four transmit/receive circuits and two terminals, each having three channels. The electronic devices are connected via two optical cables, making a signal connection between the devices (see FIG. 10). In the case of four electronic devices, it is assumed that the electronic devices each include six transmit/receive circuits and two terminals, each having six channels. The electronic devices are connected via three optical cables, making a signal connection between the devices (see FIG. 5). Moreover, in the case of five electronic devices, it is assumed that the electronic devices each include eight transmit/receive circuits and two terminals, each having ten channels. The electronic devices are connected via four optical cables, making a signal connection between the devices (see FIG. 11).

Thus, in the case of n electronic devices, it is typically assumed that the electronic devices each include $(n-1)*2$ transmit/receive circuits and two terminals, each having $n*(n-1)/2$ channels. The electronic devices are connected via $(n-1)$ cables, making a signal connection between the devices.

FIG. 12 shows the correspondence relationship among the number of electronic devices (the number of connected devices), the total number of optical cables (the total number of cables), the number of terminals (the number of device terminals), the number of transmit/receive circuits (the number of Tx/Rx), and the number of terminal channels (the number of Ch). When the number of electronic devices is n, the total number of optical cables is $(n-1)$, the number of terminals is 2, the number of transmit/receive circuits is (n−1)*2, and the number of terminal channels is n*(n−1)/2.

Fourth Embodiment

Figure 13:
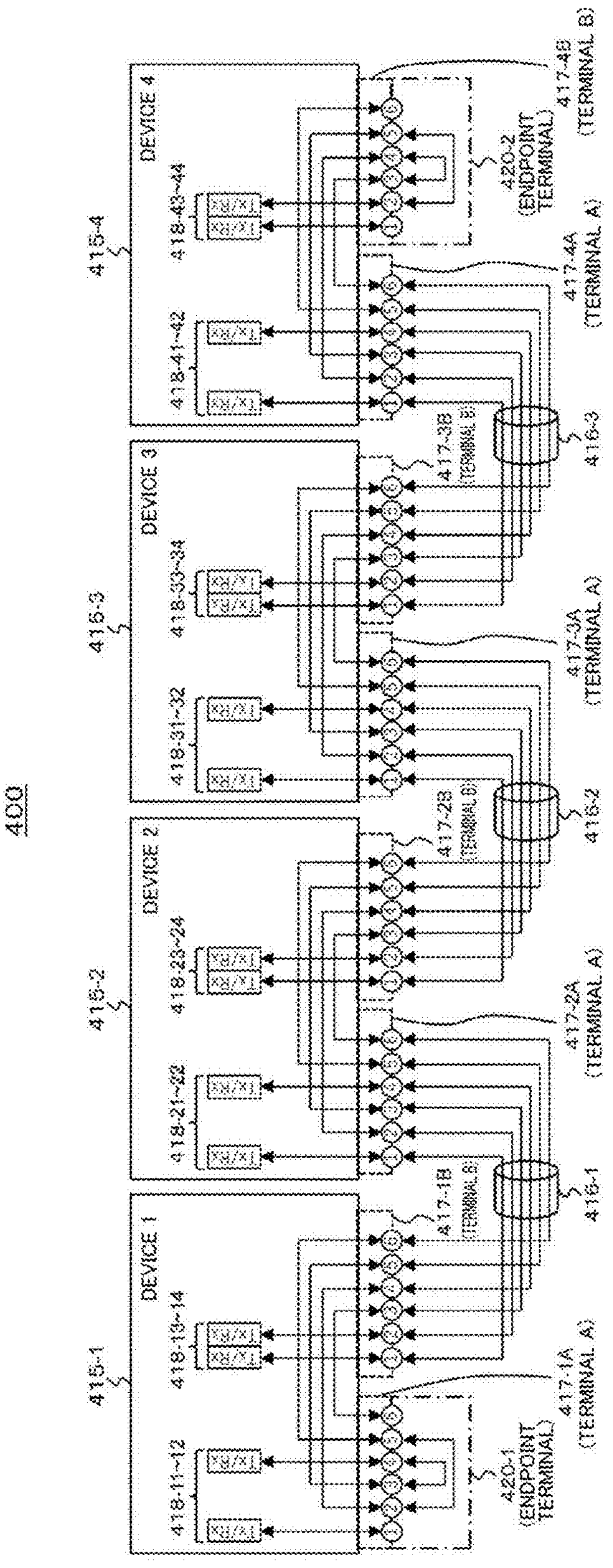
FIG. 13 illustrates a configuration example of a transmission system as a fourth embodiment.

FIG. 13 illustrates a configuration example of a transmission system 400 as a fourth embodiment. The transmission system 400 is configured with four electronic devices 415-1 to 415-4 in daisy chain connection. In this example, the electronic devices 415-1 to 415-4 each constitute a transmitter-receiver.

The electronic device 415-1 (device 1) is provided with a terminal 417-1A (terminal A) and a terminal 417-1B (terminal B) for daisy chain connection. The terminals 417-1A and 417-1B each have six channels: channels 1 to 6. In the device, some of the channels of the terminal 417-1A are shifted and directly connected to some of the channels of the terminal 417-1B via optical fibers. Transmit/receive circuits (Tx/Rx) are connected to other channels of the terminal 417-1A and other channels of the terminal 417-1B.

In this configuration, the channels 2, 3, 5, and 6 of the terminal 417-1A are directly connected respectively to the channels 4, 5, 6, and 3 of the terminal 417-1B. Furthermore, transmit/receive circuits 418-11 and 418-12 are respectively connected to the channels 1 and 4 of the terminal 417-1A, and transmit/receive circuits 418-13 and 418-14 are respectively connected to the channels 1 and 2 of the terminal 417-1B.

The electronic device 415-2 (device 2) is provided with a terminal 417-2A (terminal A) and a terminal 417-2B (terminal B) for daisy chain connection. The terminals 417-2A and 417-2B each have six channels: channels 1 to 6. In the device, some of the channels of the terminal 417-2A are shifted and directly connected to some of the channels of the terminal 417-2B via optical fibers. Transmit/receive circuits are connected to other channels of the terminal 417-2A and other channels of the terminal 417-2B.

In this configuration, the channels 2, 3, 5, and 6 of the terminal 417-2A are directly connected respectively to the channels 4, 5, 6, and 3 of the terminal 417-2B. Furthermore, transmit/receive circuits 418-21 and 418-22 are respectively connected to the channels 1 and 4 of the terminal 417-2A, and transmit/receive circuits 418-23 and 418-24 are respectively connected to the channels 1 and 2 of the terminal 417-2B.

The electronic device 415-3 (device 3) is provided with a terminal 417-3A (terminal A) and a terminal 417-3B (terminal B) for daisy chain connection. The terminals 417-3A and 417-3B each have six channels: channels 1 to 6. In the device, some of the channels of the terminal 417-3A are shifted and directly connected to some of the channels of the terminal 417-3B via optical fibers. Transmit/receive circuits are connected to other channels of the terminal 417-3A and other channels of the terminal 417-3B.

In this configuration, the channels 2, 3, 5, and 6 of the terminal 417-3A are directly connected respectively to the channels 4, 5, 6, and 3 of the terminal 417-3B. Furthermore, transmit/receive circuits 418-31 and 418-32 are respectively connected to the channels 1 and 4 of the terminal 417-3A, and transmit/receive circuits 418-33 and 418-34 are respectively connected to the channels 1 and 2 of the terminal 417-3B.

The electronic device 415-4 (device 4) is provided with a terminal 417-4A (terminal A) and a terminal 417-4B (terminal B) for daisy chain connection. The terminals 417-4A and 417-4B each have six channels: channels 1 to 6. In the device, some of the channels of the terminal 417-4A are shifted and directly connected to some of the channels of the terminal 417-4B via optical fibers. Transmit/receive circuits are connected to other channels of the terminal 417-4A and other channels of the terminal 417-4B.

In this configuration, the channels 2, 3, 5, and 6 of the terminal 417-4A are directly connected respectively to the channels 4, 5, 6, and 3 of the terminal 417-4B. Furthermore, transmit/receive circuits 418-41 and 418-42 are respectively connected to the channels 1 and 4 of the terminal 417-4A, and transmit/receive circuits 418-43 and 418-44 are respectively connected to the channels 1 and 2 of the terminal 417-4B.

Moreover, the channels 1 to 6 of the terminal 417-1B of the electronic device 415-1 are respectively connected to the channels 1 to 6 of the terminal 417-2A of the electronic device 415-2 via a six-core optical cable 416-1. Furthermore, the channels 1 to 6 of the terminal 417-2B of the electronic device 415-2 are respectively connected to the channels 1 to 6 of the terminal 417-3A of the electronic device 415-3 via a six-core optical cable 416-2. Moreover, the channels 1 to 6 of the terminal 417-3B of the electronic device 415-3 are respectively connected to the channels 1 to 6 of the terminal 417-4A of the electronic device 415-4 via a six-core optical cable 416-3.

In addition, an endpoint terminal 420-1 is connected to the terminal 417-1A, to which an optical cable is unconnected, on the electronic device 415-1 located on the left end. The endpoint terminal 420-1 directly connects the channel 2 and the channel 5 of the terminal 417-1A via an optical fiber and directly connects the channel 3 and channel 4 thereof via an optical fiber.

In addition, an endpoint terminal 420-2 is connected to the terminal 417-4B, to which an optical cable is unconnected, on the electronic device 415-4 located on the right end. The endpoint terminal 420-2 directly connects the channel 2 and the channel 5 of the terminal 417-4B via an optical fiber and directly connects the channel 3 and channel 4 thereof via an optical fiber.

In this case, the transmit/receive circuit 418-13 of the electronic device 415-1 is connected to the transmit/receive circuit 418-21 of the electronic device 415-2 via a path including the channel 1 of the terminal 417-1B, the optical cable 416-1, and the channel 1 of the terminal 417-2A.

The transmit/receive circuit 418-14 of the electronic device 415-1 is connected to the transmit/receive circuit 418-32 of the electronic device 415-3 via a path including the channel 2 of the terminal 417-1B, the optical cable 416-1, the channel 2 of the terminal 417-2A, the optical fiber (internal wiring), the channel 4 of the terminal 417-2B, the optical cable 416-2, and the channel 4 of the terminal 417-3A.

The transmit/receive circuit 418-12 of the electronic device 415-1 is connected to the transmit/receive circuit 118-44 of the electronic device 415-4 via a path including the channel 4 of the terminal 417-1A, the optical fiber (internal wiring) of the endpoint terminal 420-1, the channel 3 of the terminal 417-1A, the optical fiber (internal wiring), the channel 5 of the terminal 417-1B, the optical cable 416-1, the channel 5 of the terminal 417-2A, the optical fiber (internal wiring), the channel 6 of the terminal 417-2B, the optical cable 416-2, the channel 6 of the terminal 417-3A, the optical fiber (internal wiring), the channel 3 of the terminal 417-3B, the optical cable 416-3, the channel 3 of the terminal 417-4A, the optical fiber (internal wiring), the channel 5 of the terminal 417-B, the optical fiber (internal wiring) of the endpoint terminal 420-2, and the channel 2 of the terminal 417-4B.

Furthermore, the transmit/receive circuit 418-23 of the electronic device 415-2 is connected to the transmit/receive circuit 418-31 of the electronic device 415-3 via a path including the channel 1 of the terminal 417-2B, the optical cable 416-2, and the channel 1 of the terminal 417-3A.

The transmit/receive circuit 418-24 of the electronic device 415-2 is connected to the transmit/receive circuit 418-42 of the electronic device 415-4 via a path including the channel 2 of the terminal 417-2B, the optical cable 416-2, the channel 2 of the terminal 417-3A, the optical fiber (internal wiring), the channel 4 of the terminal 417-3B, the optical cable 416-3, and the channel 4 of the terminal 417-4A.

Furthermore, the transmit/receive circuit 418-33 of the electronic device 415-3 is connected to the transmit/receive circuit 418-41 of the electronic device 415-4 via a path including the channel 1 of the terminal 417-3B, the optical cable 416-3, and the channel 1 of the terminal 417-4A.

In the transmission system 400 in FIG. 13, as in the transmission system 100 in FIG. 5, some of the channels of the terminal A are shifted and directly connected to some of the channels of the terminal B via the optical fibers and the transmit/receive circuits are connected to other channels of the terminal A and other channels of the terminal B in each of the electronic devices. This can properly make a signal connection between the electronic devices to make a daisy chain connection. Furthermore, even if another electronic device is present between the electronic devices to make a signal connection and the electronic devices are turned off, a signal connection can be made without causing any problems. For example, even if the electronic devices 415-2 (device 2) to 415-3 (device 3) are turned off, a signal connection can be made between the electronic device 415-1 (device 1) and the electronic device 415-4 (device 4).

Before communications with other devices are started in the electronic devices 415 (electronic devices 415-1 to 415-4) constituting the transmission system 400 in FIG. 13, a procedure is similar to that of the electronic devices 115 (electronic devices 115-1 to 115-4) constituting the transmission system 100 in FIG. 5 (see the flowcharts of FIGS. 6 and 8). The detailed description of the procedure is omitted.

In the transmission system 400 in FIG. 13, the endpoint terminal 420-1 or 420-2 for directly connecting specific channels is connected to the terminal A or the terminal B, to which the cable is unconnected, on the electronic devices 415-1 and 415-4 on both ends among the electronic devices 415-1 to 415-4 in daisy chain connection. This configuration can reduce the number of transmit/receive circuits in each of the electronic devices. In this case, the endpoint terminals 420-1 and 420-2 are connected to form a loop of a path, achieving efficient use of the transmit/receive circuits. In the transmission system 100 in FIG. 5, each of the electronic devices 115-1 to 115-4 needs to have the six transmit/receive circuits. In the transmission system 400 in FIG. 13, each of the electronic devices 415-1 to 415-4 only needs the four transmit/receive circuits.

The transmission system 400 in FIG. 13 is configured with the four electronic devices 415-1 to 415-4 in daisy chain connection. Also in the case of any other number of electronic devices to make a daisy connection, the number of transmit/receive circuits can be similarly reduced by using endpoint terminals. A detailed description of the configuration is omitted.

Fifth Embodiment

Figure 14:
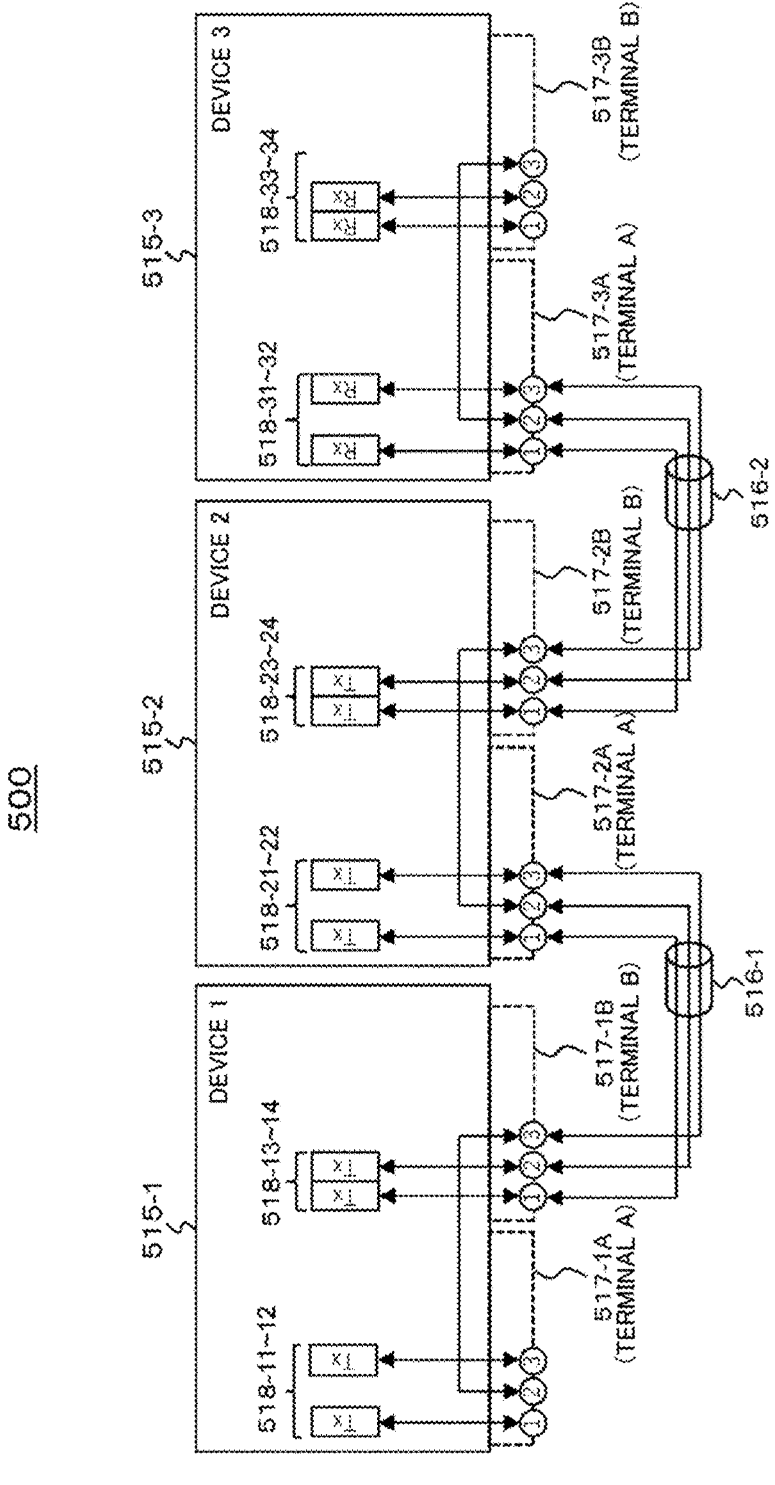
FIG. 14 illustrates a configuration example of a transmission system as a fifth embodiment.

FIG. 14 illustrates a configuration example of a transmission system 500 as a fifth embodiment. The transmission system 500 is configured with three electronic devices 515-1 to 515-3 in daisy chain connection. In this example, the electronic devices 515-1 and 515-2 each constitute a transmitter and the electronic device 515-3 constitutes a receiver.

The electronic device 515-1 (device 1) is provided with a terminal 517-1A (terminal A) and a terminal 517-1B (terminal B) for daisy chain connection. The terminals 517-1A and 517-1B each have three channels: channels 1 to 3. In the device, some of the channels of the terminal 517-1A are shifted and directly connected to some of the channels of the terminal 517-1B via optical fibers. Transmitting circuits (Tx) are connected to other channels of the terminal 517-1A and other channels of the terminal 517-1B.

In this configuration, the channel 2 of the terminal 517-1A is directly connected to the channel 3 of the terminal 517-1B. Furthermore, transmitting circuits 518-11 and 518-12 are respectively connected to the channels 1 and 3 of the terminal 517-1A, and transmitting circuit 518-13 and 518-14 are respectively connected to the channels 1 and 2 of the terminal 517-1B.

The electronic device 515-2 (device 2) is provided with a terminal 517-2A (terminal A) and a terminal 517-2B (terminal B) for daisy chain connection. The terminals 517-2A and 517-2B each have three channels: channels 1 to 3. In the device, some of the channels of the terminal 517-2A are shifted and directly connected to some of the channels of the terminal 517-2B via optical fibers. Transmitting circuits (Tx) are connected to other channels of the terminal 517-2A and other channels of the terminal 517-2B.

In this configuration, the channel 2 of the terminal 517-2A is directly connected to the channel 3 of the terminal 517-2B. Furthermore, transmitting circuits 518-21 and 518-22 are respectively connected to the channels 1 and 3 of the terminal 517-2A, and transmitting circuit 518-23 and 518-24 are respectively connected to the channels 1 and 2 of the terminal 517-2B.

The electronic device 515-3 (device 3) is provided with a terminal 517-3A (terminal A) and a terminal 517-3B (terminal B) for daisy chain connection. The terminals 517-3A and 517-3B each have three channels: channels 1 to 3. In the device, some of the channels of the terminal 517-3A are shifted and directly connected to some of the channels of the terminal 517-3B via optical fibers. Receiving circuits (Rx) are connected to other channels of the terminal 517-3A and other channels of the terminal 517-3B.

In this configuration, the channel 2 of the terminal 517-3A is directly connected to the channel 3 of the terminal 517-3B. Furthermore, receiving circuits 518-31 and 518-32 are respectively connected to the channels 1 and 3 of the terminal 517-3A, and receiving circuits 518-33 and 518-34 are respectively connected to the channels 1 and 2 of the terminal 517-3B.

The channels 1 to 3 of the terminal 517-1B of the electronic device 515-1 are respectively connected to the channels 1 to 3 of the terminal 517-2A of the electronic device 515-2 via a three-core optical cable 516-1. The channels 1 to 3 of the terminal 517-2B of the electronic device 515-2 are respectively connected to the channels 1 to 3 of the terminal 517-3A of the electronic device 515-3 via a three-core optical cable 516-2.

In this case, the transmitting circuit 518-13 of the electronic device 515-1 is connected to the transmitting circuit 518-21 of the electronic device 515-2 via a path including the channel 1 of the terminal 517-1B, the optical cable 516-1, and the channel 1 of the terminal 517-2A.

The transmitting circuit 518-14 of the electronic device 515-1 is connected to the receiving circuit 218-32 of the electronic device 515-3 via a path including the channel 2 of the terminal 517-1B, the optical cable 516-1, the channel 2 of the terminal 517-2A, the optical fiber (internal wiring), the channel 3 of the terminal 517-2B, the optical cable 516-2, and the channel 3 of the terminal 517-3A.

Furthermore, the transmitting circuit 518-23 of the electronic device 515-2 is connected to the receiving circuit 518-31 of the electronic device 515-3 via a path including the channel 1 of the terminal 517-2B, the optical cable 516-2, and the channel 1 of the terminal 517-3A.

Figure 15:
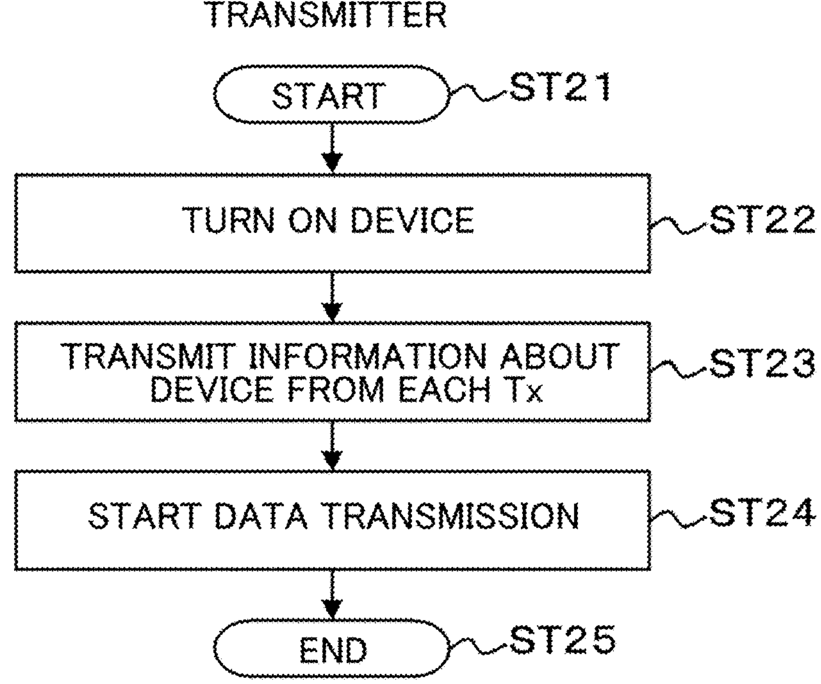
FIG. 15 is a flowchart showing an example of a procedure before data transmission is started in the electronic device (transmitter).

The flowchart of FIG. 15 shows an example of a procedure before data transmission is started in electronic devices 515T (the electronic device 515-1, the electronic device 515-2) serving as transmitters.

First, in step ST21, the electronic device 515T starts processing. In step ST22, the electronic device 515T turns on the power supply of the device. In step ST23, the electronic device 515T then transmits information about the device from the transmitting circuits (Tx). The information about the device includes address information (e.g., "xxxx") and label information (e.g., "a video player in a living room").

In step ST24, the electronic device 515T starts data transmission. In step ST25, the electronic device 515T terminates the processing. Thus, the electronic device 515T can start data transmission after transmitting the information about the device from the transmitting circuits.

Figure 16:
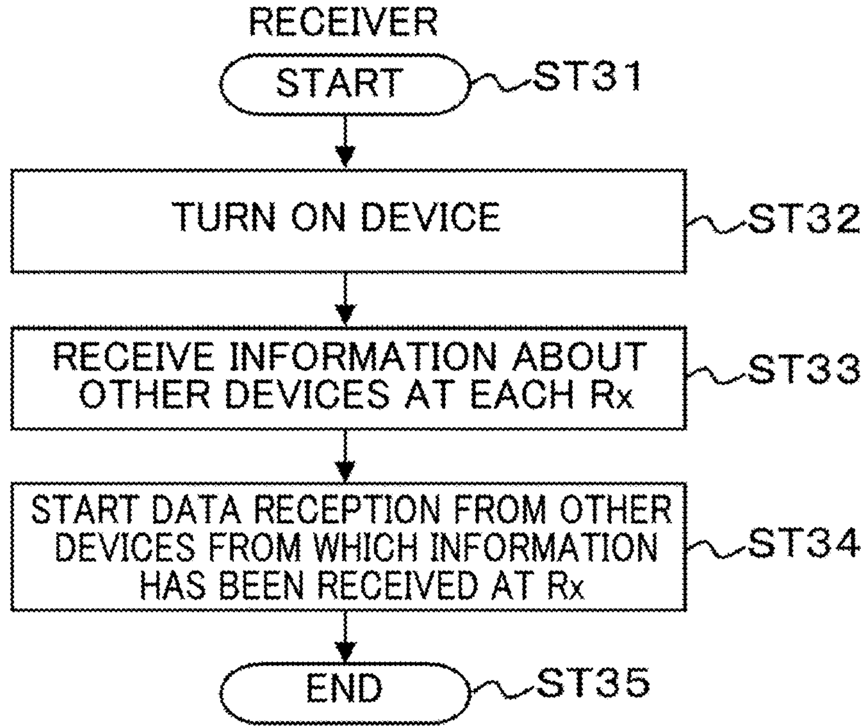
FIG. 16 is a flowchart showing an example of a procedure before data reception is started in the electronic device (receiver).

The flowchart of FIG. 16 shows an example of a procedure before data reception is started in an electronic device 515R (electronic device 515-3) serving as a receiver.

First, in step ST31, the electronic device 515R starts processing. In step ST32, the electronic device 515R turns on the power supply of the device. In step ST33, the electronic device 515R then receives information about other devices at the receiving circuits (Rx). The information about other devices includes address information (e.g., "xxxx") and label information (e.g., "a video player in a living room").

In step ST34, the electronic device 515R starts data reception from other devices, from which the information has been received at the receiving circuits. In step ST35, the electronic device 515R terminates the processing. Thus, the electronic device 515R can start data reception from other devices after receiving the information about other devices at the receiving circuits.

Figure 17:
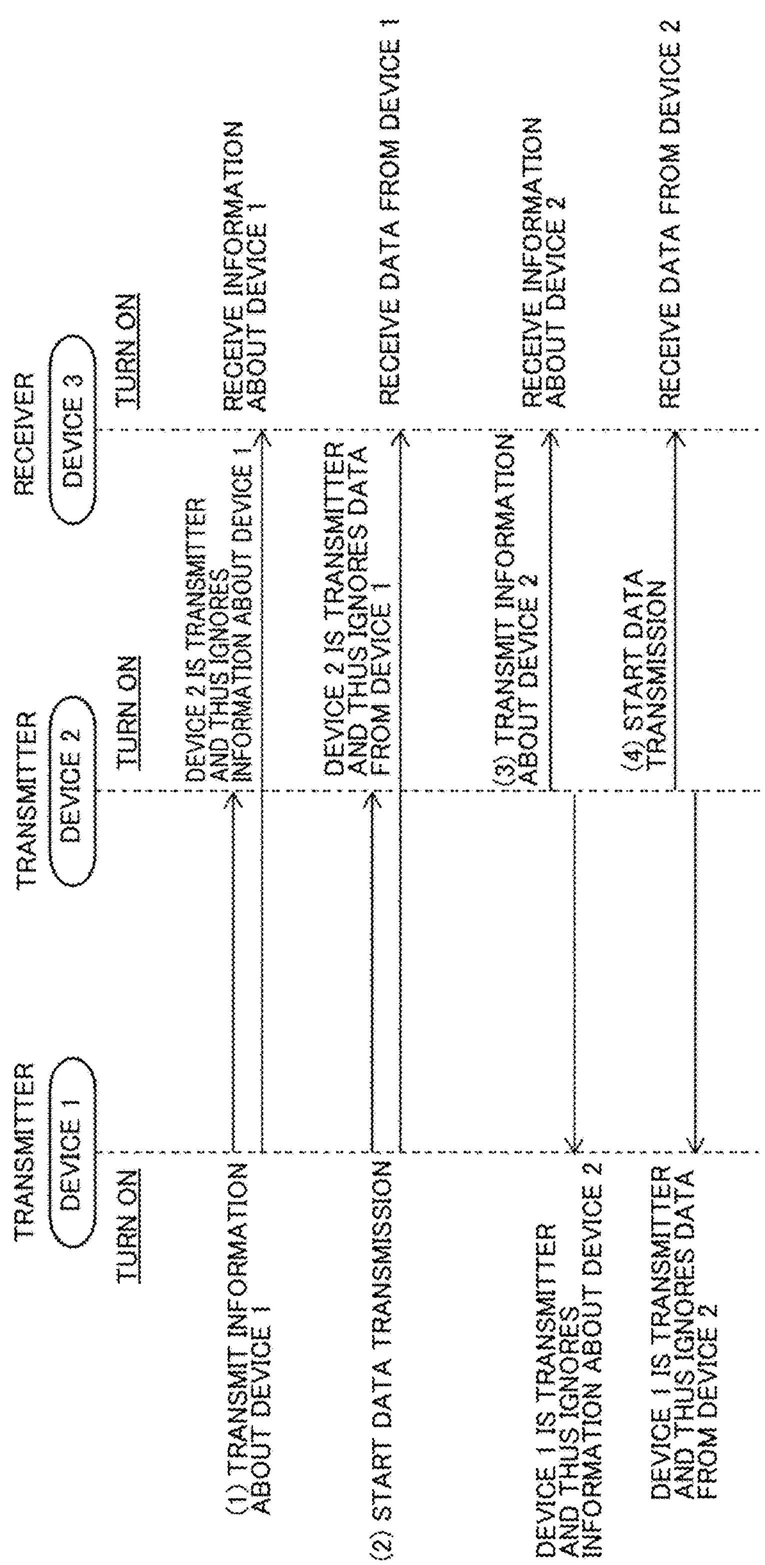
FIG. 17 is a sequence diagram showing an example of exchange of information before device-to-device communications are started.

The sequence diagram of FIG. 17 shows an example of exchange of information before device-to-device communications are started, in the flowcharts of FIGS. 15 and 16 showing the procedure before each device starts data transmission or data reception. The sequence diagram is intended to represent the case where the devices are turned on at the same time.

(1) First, the device 1 transmits information about the device 1 (device) after being turned on. In this case, the device 2 is a transmitter and thus ignores the information about the device 1. The device 3 receives the information about the device 1. (2) The device 1 then starts data transmission. In this case, the device 2 is a transmitter and thus ignores the data from the device 1. The device 3 receives the data from the device 1.

(3) The device 2 then transmits information about the device 2 (device). In this case, the device 1 is a transmitter and thus ignores the information about the device 2. The device 3 receives the information about the device 2. (4) The device 2 then starts data transmission. In this case, the device 1 is a transmitter and thus ignores the data from the device 2. The device 3 receives the data from the device 2.

Figure 18:
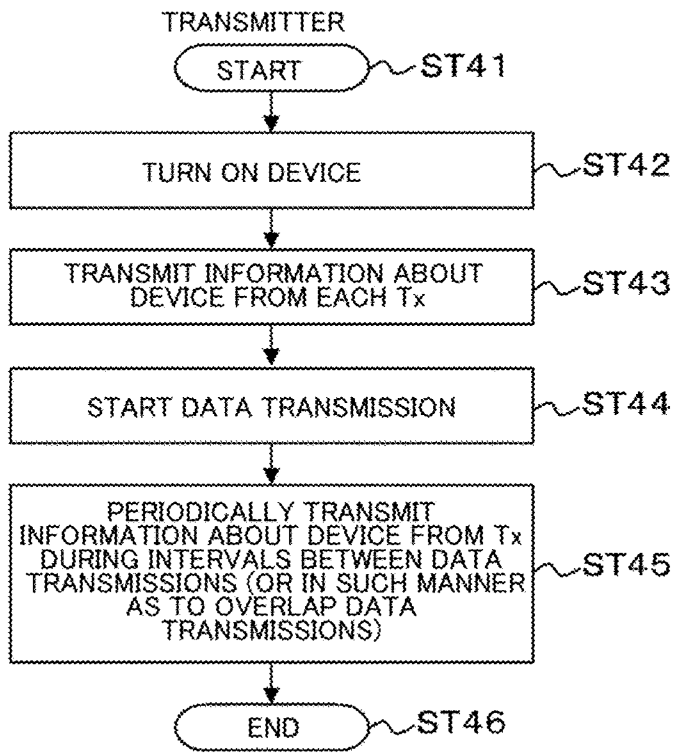
FIG. 18 is a flowchart showing an example of a procedure before data transmission is started in the electronic device (transmitter).

The flowchart of FIG. 18 shows another example of a procedure before data transmission is started in the electronic devices 515T (the electronic device 515-1, the electronic device 515-2) serving as transmitters. In this example, even if the receiver is turned on after the device, data reception can be started after the receiver receives information about the device.

First, in step ST41, the electronic device 515T starts processing. In step ST42, the electronic device 515T turns on the power supply of the device. In step ST43, the electronic device 515T then transmits information about the device from the transmitting circuits (Tx).

Subsequently, in step ST44, the electronic device 515T starts data transmission. In step ST45, the information about the device is periodically transmitted from the transmitting circuits (Tx) during intervals between data transmissions (or in such a manner as to overlap data transmissions). In step ST46, the electronic device 515T terminates the processing.

The electronic device 515T periodically transmits information about the device during intervals between data transmissions (or in such a manner as to overlap data transmissions), so that even if the receiver is turned on after the device, data reception can be started after the receiver receives the information about the device.

Figure 19:
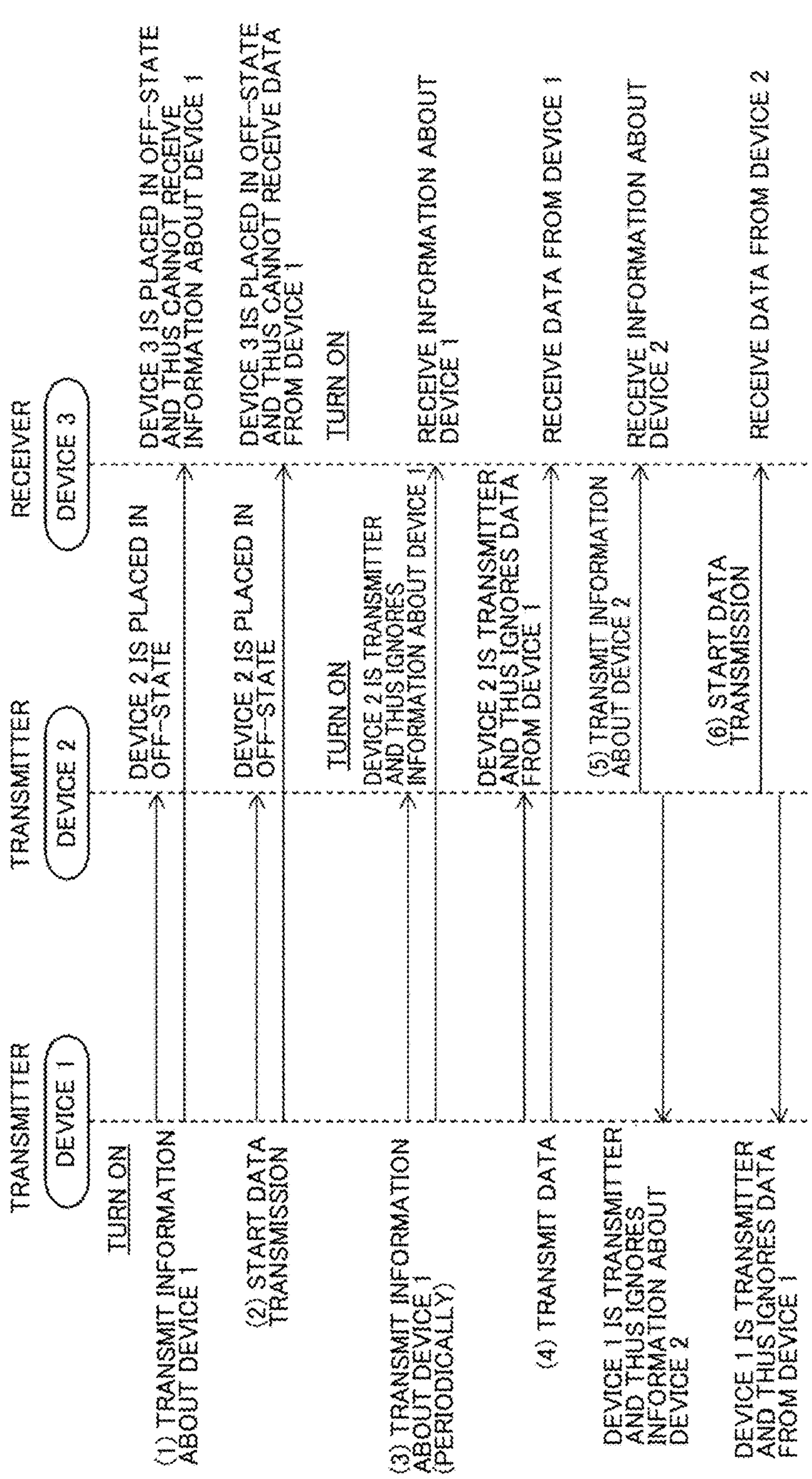
FIG. 19 is a sequence diagram showing an example of exchange of information before device-to-device communications are started.

The sequence diagram of FIG. 19 shows an example of exchange of information before device-to-device communications are started, in the flowcharts of FIGS. 18 and 16 showing the procedure before each device starts data transmission or data reception. The sequence diagram is intended to represent the case where the device 2 and the device 3 are turned on after the device 1 is turned on.

(1) First, the device 1 transmits information about the device 1 (device) after being turned on. In this case, the device 2 is placed in an off-state. The device 3 is placed in an off-state and thus cannot receive the information about the device 1.

(2) The device 1 then starts data transmission. In this case, the device 2 is placed in an off-state. The device 3 is placed in an off-state and thus cannot receive the data from the device 1. Thereafter, the device 2 and the device 3 are supposed to be turned on.

(3) The device 1 then periodically transmits information about the device 1 (device). In this case, the device 2 is a transmitter and thus ignores the information about the device 1. The device 3 is a receiver and thus receives the information about the device 1. (4) The device 1 then starts data transmission. In this case, the device 2 is a transmitter and thus ignores the data from the device 1. The device 3 receives the data from the device 1.

(5) The device 2 then transmits information about the device 2 (device). In this case, the device 1 is a transmitter and thus ignores the information about the device 2. The device 3 receives the information about the device 2. (6) The device 2 then starts data transmission. In this case, the device 1 is a transmitter and thus ignores the data from the device 2. The device 3 receives the data from the device 2.

In the transmission system 500 in FIG. 14, as in the transmission system 100 in FIG. 5, some of the channels of the terminal A are shifted and directly connected to some of the channels of the terminal B via the optical fibers and the transmitting circuits or receiving circuits are connected to other channels of the terminal A and other channels of the terminal B in each of the electronic devices. This can properly make a signal connection between the electronic devices to make a daisy chain connection. Furthermore, even if another electronic device is present between the electronic devices to make a signal connection and the electronic devices are turned off, a signal connection can be made without causing any problems. For example, even if the electronic device 515-2 (device 2) is turned off, a signal connection can be made between the electronic device 515-1 (device 1) and the electronic device 515-3 (device 3).

In the transmission system 500 in FIG. 14, the electronic device 515-1 (device 1) serving as a transmitter, the electronic device 515-2 (device 2) serving as a transmitter, and the electronic device 515-3 (device 3) serving as a receiver are connected in this order. The electronic devices similarly operate even when connected in a different order. In other words, the electronic devices can be connected in any order to perform necessary signal communications regardless of whether the electronic devices are transmitters or receivers.

Sixth Embodiment

Figure 20:
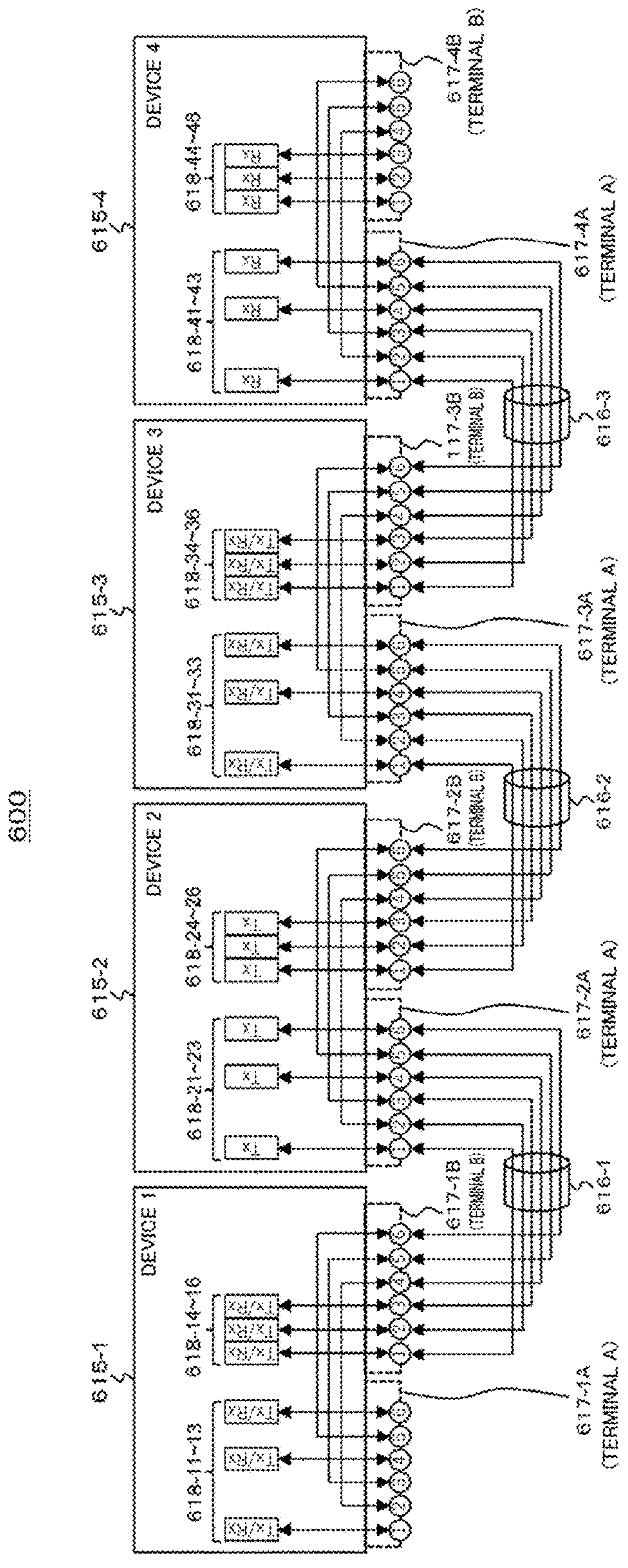
FIG. 20 illustrates a configuration example of a transmission system as a sixth embodiment.

FIG. 20 illustrates a configuration example of a transmission system 600 as a sixth embodiment. The transmission system 600 is configured with four electronic devices 615-1 to 615-4 in daisy chain connection. In this example, the electronic devices 615-1 and 615-3 each constitute a transmitter-receiver, the electronic device 615-2 constitutes a transmitter, and the electronic device 615-4 constitutes a receiver.

The electronic device 615-1 (device 1) is provided with a terminal 617-1A (terminal A) and a terminal 617-1B (terminal B) for daisy chain connection. The terminals 617-1A and 617-1B each have six channels: channels 1 to 6. In the device, some of the channels of the terminal 617-1A are shifted and directly connected to some of the channels of the terminal 617-1B via optical fibers. Transmit/receive circuits (Tx/Rx) are connected to other channels of the terminal 617-1A and other channels of the terminal 617-1B.

In this configuration, the channels 2, 3, and 5 of the terminal 617-1A are directly connected respectively to the channels 4, 5, and 6 of the terminal 617-1B. Furthermore, transmit/receive circuits 618-11 to 618-13 are respectively connected to the channels 1, 4, and 6 of the terminal 617-1A, and transmit/receive circuits 618-14 to 618-16 are respectively connected to the channels 1, 2, and 3 of the terminal 617-1B.

The electronic device 615-2 (device 2) is provided with a terminal 617-2A (terminal A) and a terminal 617-2B (terminal B) for daisy chain connection. The terminals 617-2A and 617-2B each have six channels: channels 1 to 6. In the device, some of the channels of the terminal 617-2A are shifted and directly connected to some of the channels of the terminal 617-2B via optical fibers. Transmitting circuits (Tx) are connected to other channels of the terminal 617-2A and other channels of the terminal 617-2B.

In this configuration, the channels 2, 3, and 5 of the terminal 617-2A are directly connected respectively to the channels 4, 5, and 6 of the terminal 617-2B. Furthermore, transmitting circuits 618-21 to 618-23 are respectively connected to the channels 1, 4, and 6 of the terminal 617-2A, and transmitting circuits 618-24 to 618-26 are respectively connected to the channels 1, 2, and 3 of the terminal 617-2B.

The electronic device 615-3 (device 3) is provided with a terminal 617-3A (terminal A) and a terminal 617-3B (terminal B) for daisy chain connection. The terminals 617-3A and 617-3B each have six channels: channels 1 to 6. In the device, some of the channels of the terminal 617-3A are shifted and directly connected to some of the channels of the terminal 617-3B via optical fibers. Transmit/receive circuits (Tx/Rx) are connected to other channels of the terminal 617-3A and other channels of the terminal 617-3B.

In this configuration, the channels 2, 3, and 5 of the terminal 617-3A are directly connected respectively to the channels 4, 5, and 6 of the terminal 617-3B. Furthermore, transmit/receive circuits 618-31 to 618-33 are respectively connected to the channels 1, 4, and 6 of the terminal 617-3A, and transmit/receive circuits 618-34 to 618-36 are respectively connected to the channels 1, 2, and 3 of the terminal 617-3B.

The electronic device 615-4 (device 4) is provided with a terminal 617-4A (terminal A) and a terminal 617-4B (terminal B) for daisy chain connection. The terminals 617-4A and 617-4B each have six channels: channels 1 to 6. In the device, some of the channels of the terminal 617-4A are shifted and directly connected to some of the channels of the terminal 617-4B via optical fibers. Receiving circuits (Rx) are connected to other channels of the terminal 617-4A and other channels of the terminal 617-4B.

In this configuration, the channels 2, 3, and 5 of the terminal 617-4A are directly connected respectively to the channels 4, 5, and 6 of the terminal 617-4B. Furthermore, receiving circuits 618-41 to 618-43 are respectively connected to the channels 1, 4, and 6 of the terminal 617-4A, and receiving circuits 618-44 to 618-46 are respectively connected to the channels 1, 2, and 3 of the terminal 617-4B.

Moreover, the channels 1 to 6 of the terminal 617-1B of the electronic device 615-1 are respectively connected to the channels 1 to 6 of the terminal 617-2A of the electronic device 615-2 via a six-core optical cable 616-1. Furthermore, the channels 1 to 6 of the terminal 617-2B of the electronic device 615-2 are respectively connected to the channels 1 to 6 of the terminal 617-3A of the electronic device 615-3 via a six-core optical cable 616-2. Moreover, the channels 1 to 6 of the terminal 617-3B of the electronic device 615-3 are respectively connected to the channels 1 to 6 of the terminal 617-4A of the electronic device 615-4 via a six-core optical cable 616-3.

In this case, the transmit/receive circuit 618-14 of the electronic device 615-1 is connected to the transmitting circuit 618-21 of the electronic device 615-2 via a path including the channel 1 of the terminal 617-1B, the optical cable 616-1, and the channel 1 of the terminal 617-2A.

The transmit/receive circuit 118-15 of the electronic device 615-1 is connected to the transmit/receive circuit 618-32 of the electronic device 615-3 via a path including the channel 2 of the terminal 617-1B, the optical cable 616-1, the channel 2 of the terminal 617-2A, the optical fiber (internal wiring), the channel 4 of the terminal 667-2B, the optical cable 616-2, and the channel 4 of the terminal 617-3A.

The transmit/receive circuit 618-16 of the electronic device 615-1 is connected to the receiving circuit 618-43 of the electronic device 615-4 via a path including the channel 3 of the terminal 617-1B, the optical cable 616-1, the channel 3 of the terminal 617-2A, the optical fiber (internal wiring), the channel 5 of the terminal 617-2B, the optical cable 616-2, the channel 5 of the terminal 617-3A, the optical fiber (internal wiring), the channel 6 of the terminal 617-3B, the optical fiber 616-3, and the channel 6 of the terminal 617-4A.

Furthermore, the transmitting circuit 618-24 of the electronic device 615-2 is connected to the transmit/receive circuit 618-31 of the electronic device 615-3 via a path including the channel 1 of the terminal 617-2B, the optical cable 616-2, and the channel 1 of the terminal 617-3A.

The transmitting circuit 618-25 of the electronic device 615-2 is connected to the receiving circuit 618-42 of the electronic device 615-4 via a path including the channel 2 of the terminal 617-2B, the optical cable 616-2, the channel 2 of the terminal 617-3A, the optical fiber (internal wiring), the channel 4 of the terminal 617-3B, the optical cable 616-3, and the channel 4 of the terminal 617-4A.

Furthermore, the transmit/receive circuit 618-34 of the electronic device 615-3 is connected to the receiving circuit 618-41 of the electronic device 615-4 via a path including the channel 1 of the terminal 617-3B, the optical cable 616-3, and the channel 1 of the terminal 617-4A.

Figure 21:
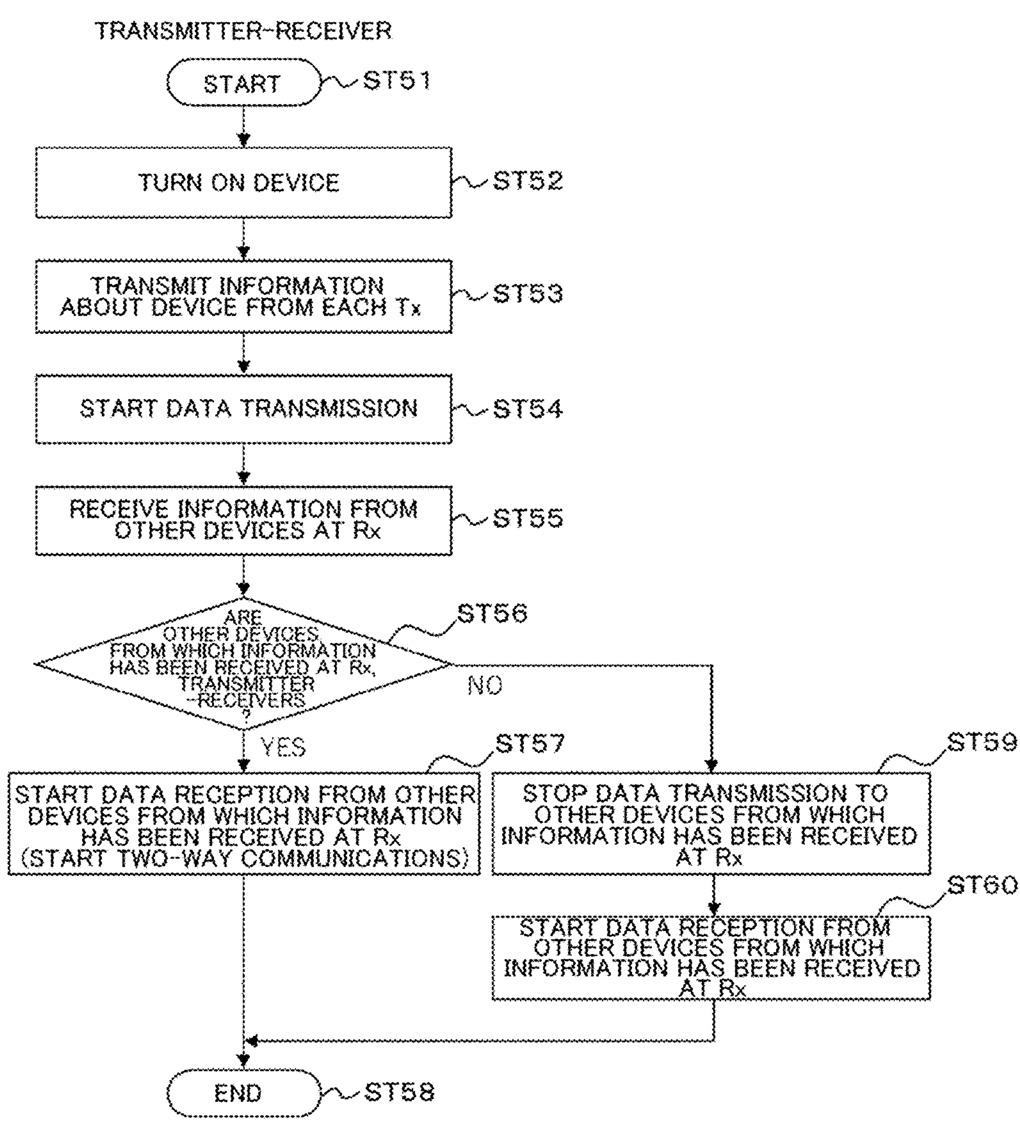
FIG. 21 is a flowchart showing an example of a procedure before communications with other devices are started in the electronic device (transmitter-receiver).

The flowchart of FIG. 21 shows an example of a procedure before communications with other devices are started in electronic devices 615TR (the electronic device 615-1, the electronic device 615-3) serving as transmitter-receivers.

First, in step ST51, the electronic device 615TR starts processing. In step ST52, the electronic device 615TR turns on the power supply of the device. In step ST53, the electronic device 615TR then transmits information about the device from the transmitting units (Tx) of the transmit/receive circuits. The information about the device includes address information and label information.

In step ST54, the electronic device 615TR then starts data transmission. In step ST55, the electronic device 615TR then receives information from other devices at receiving units (Rx). The information about other devices includes address information and label information.

In step ST56, the electronic device 615TR determines whether other devices, from which the information has been received at the receiving units (Rx), are transmitter-receivers or not. In this case, the electronic device 615TR determines whether other devices are transmitter-receivers or not on the basis of the information received from other devices in step ST55.

When it is determined that other devices are transmitter-receivers, in step ST57, the electronic device 615TR starts data reception from other devices, from which the information has been received at the receiving units (Rx), that is, the electronic device 615TR starts two-way communications. After the processing of step ST57, the electronic device 615TR terminates the processing in step ST58.

When it is determined that other devices are not transmitter-receivers, that is, other devices are transmitters in step ST56, the electronic device 615TR stops data transmission to other devices, from which the information has been received at the receiving units (Rx), in step ST59. This is because other devices, from which the information has been received at the receiving units (Rx), are transmitters and thus data transmission is unnecessary.

In step ST60, the electronic device 615TR starts data reception from other devices, from which the information has been received at the receiving units (Rx). After the processing of step ST60, the electronic device 615TR terminates the processing in step ST58.

In this case, before data transmission is started in the electronic device 615T (electronic device 615-2) serving as a transmitter, a procedure is similar to a procedure before data transmission is started in the electronic devices 515T (electronic devices 515-1 and 515-2) serving as transmitters of the electronic system 500 in FIG. 14 (see the flowchart of FIG. 15). The detailed description of the procedure is omitted.

Moreover, in this case, before data reception is started in the electronic device 615R (electronic device 615-2) serving as a receiver, a procedure is similar to a procedure before data reception is started in the electronic device 515R (electronic device 515-3) serving as a receiver of the electronic system 500 in FIG. 14 (see the flowchart of FIG. 16). The detailed description of the procedure is omitted.

Figure 22:
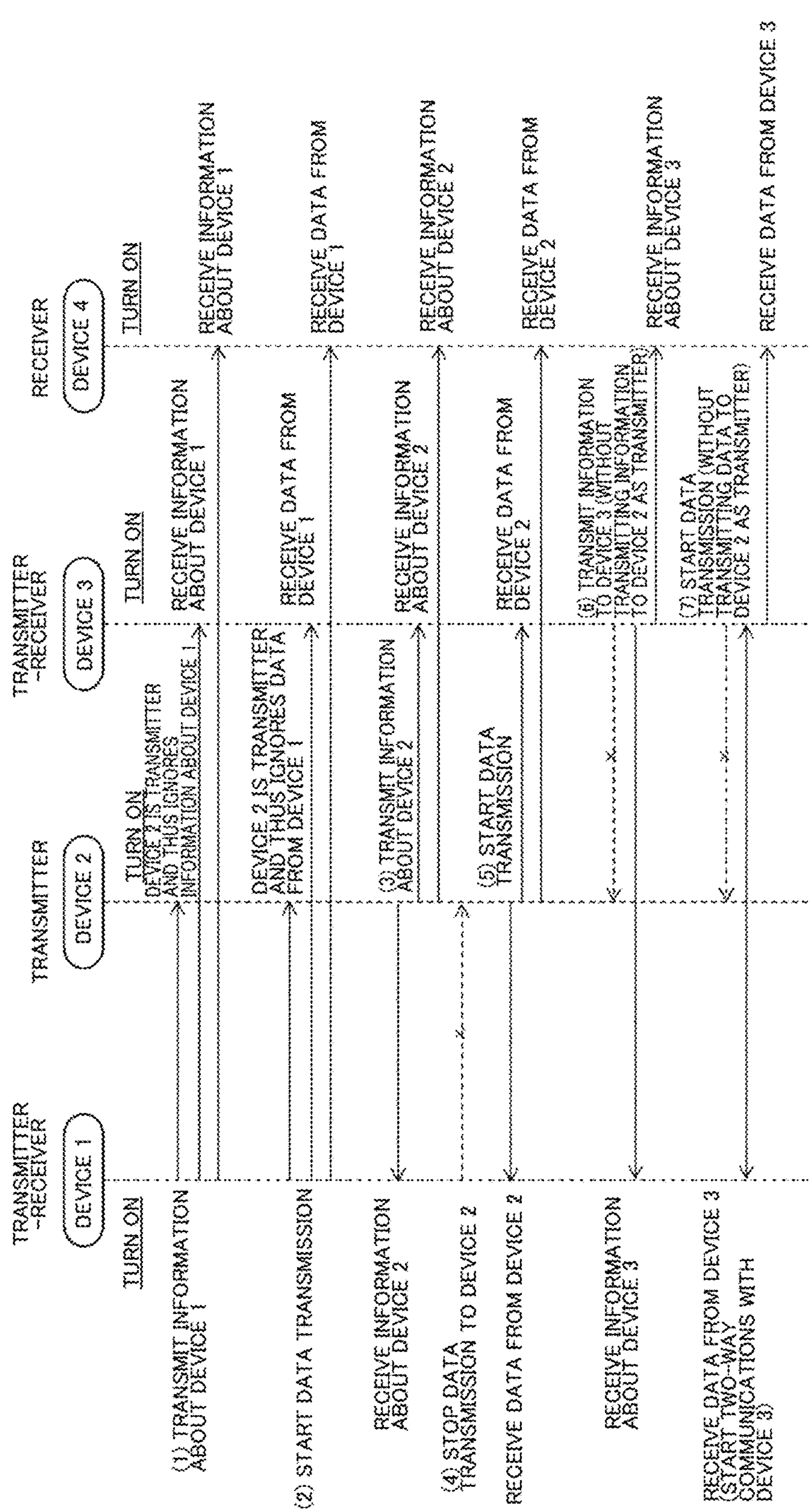
FIG. 22 is a sequence diagram showing an example of exchange of information before device-to-device communications are started.

The sequence diagram of FIG. 22 shows an example of exchange of information before device-to-device communications are started, in the flowcharts of FIGS. 21, 15, and 16 showing the procedure before each device starts data transmission or data reception. The sequence diagram is intended to represent the case where the devices are turned on at the same time.

(1) First, the device 1 transmits information about the device 1 (device) after being turned on. In this case, the device 2 is a transmitter and thus ignores the information about the device 1. The device 3 and the device 4 receive the information about the device 1. (2) The device 1 then starts data transmission. In this case, the device 2 is a transmitter and thus ignores the data from the device 1. The device 3 and the device 4 receive the data from the device 1.

(3) Subsequently, the device 2 transmits information about the device 2 (device). In this case, the device 1, the device 3, and the device 4 receive the information about the device 2. (4) The device 1 having received the information about the device 2 determines that the device 2 is a transmitter, and stops data transmission to the device 2. (5) The device 2 then starts data transmission. In this case, the device 1, the device 3, and the device 4 receive the data from the device 2.

(6) Subsequently, the device 3 transmits information about the device 3 (device). At this point, the device 3 having received the information about the device 2 can determine that the device 2 is a transmitter, and does not transmit information to the device 2. In this case, the device 1 and the device 4 receive the information about the device 3. (7) The device 3 then starts data transmission. In this case, the device 3 does not transmit data to the device 2 serving as a transmitter. In this case, the device 1 and the device 4 receive data from the device 3.

Figure 23:
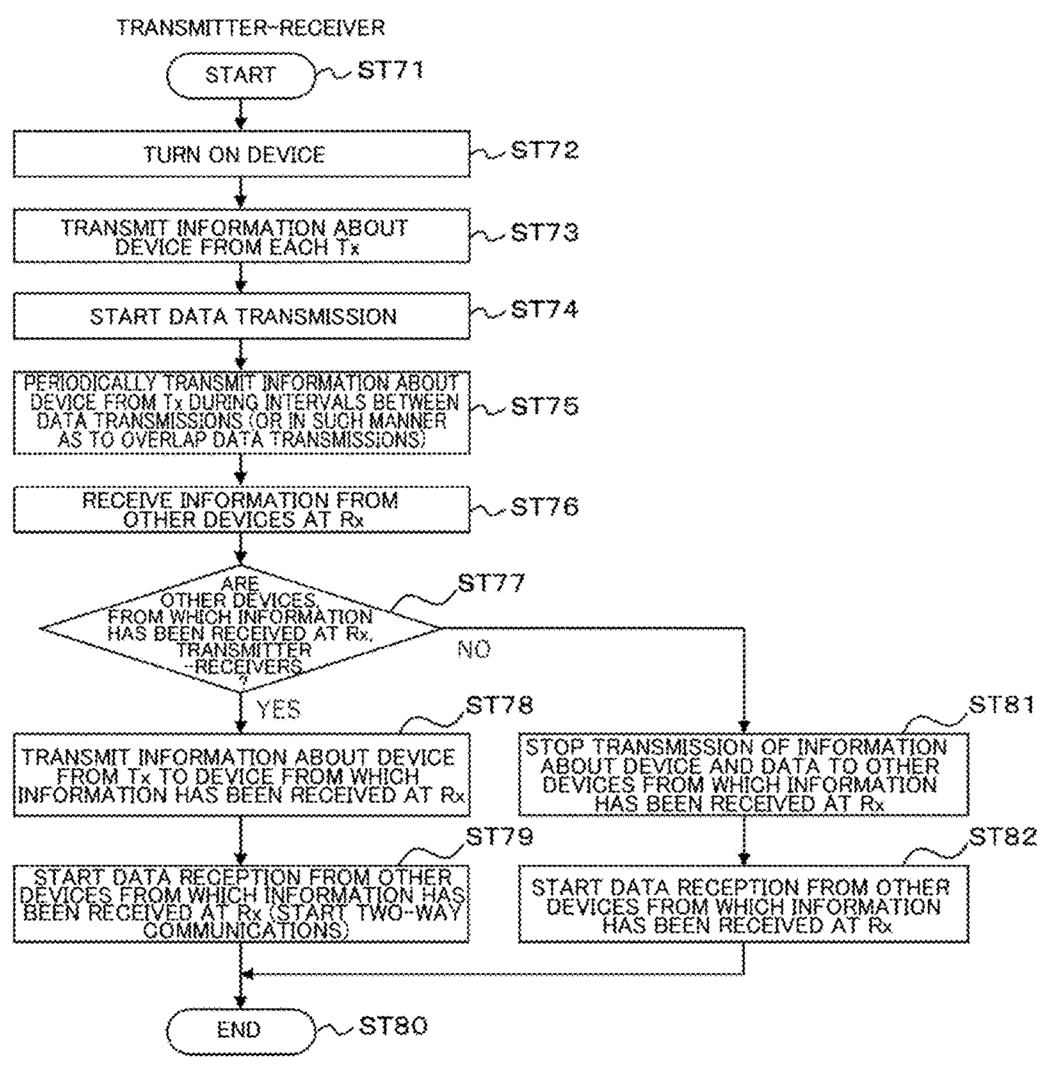
FIG. 23 is a flowchart showing an example of a procedure before communications with other devices are started in the electronic device (transmitter-receiver).

The flowchart of FIG. 23 shows another example of a procedure before communications with other devices are started in electronic devices 615TR (the electronic device 615-1, the electronic device 615-3) serving as transmitter-receivers. In this example, even if other transmitter-receivers or receivers are turned on after the device, data reception can be started after the device receives information about the device.

First, in step ST71, the electronic device 615TR starts processing. In step ST72, the electronic device 615TR turns on the power supply of the device. In step ST73, the electronic device 615TR then transmits information about the device from the transmitting units (Tx) of the transmit/receive circuits. The information about the device includes address information and label information.

Subsequently, in step ST74, the electronic device 615TR starts data transmission. In step ST75, the electronic device 615TR periodically transmits the information about the device from the transmitting circuits (Tx) during intervals between data transmissions (or in such a manner as to overlap data transmissions). In step ST76, the electronic device 615TR then receives information from other devices at the receiving units (Rx). The information about other devices includes address information and label information.

In step ST77, the electronic device 615TR determines whether other devices, from which the information has been received at the receiving units (Rx), are transmitter-receivers or not. In this case, the electronic device 615TR determines whether other devices are transmitter-receivers or not on the basis of the information received from other devices in step ST76.

When it is determined that other devices are transmitter-receivers, in step ST78, the electronic device 615TR transmits information about the device from the transmitting units (Tx) to other devices, from which the information has been received at the receiving units (Rx). Subsequently, in step ST79, the electronic device 615TR starts data reception from other devices, from which the information has been received at the receiving units (Rx), that is, the electronic device 615TR starts two-way communications. After the processing of step ST79, the electronic device 615TR terminates the processing in step ST80.

When it is determined that other devices are not transmitter-receivers, that is, other devices are transmitters in step ST77, the electronic device 615TR stops transmitting information about the device and data to other devices, from which the information has been received at the receiving units (Rx), in step ST81. This is because other devices, from which the information has been received at the receiving units (Rx), are transmitters and thus the transmission of information about the device and data is unnecessary.

In step ST82, the electronic device 615TR starts data reception from other devices, from which the information has been received at the receiving units (Rx). After the processing of step ST82, the electronic device 615TR terminates the processing in step ST60.

In this case, before data transmission is started in the electronic device 615T (electronic device 615-2) serving as a transmitter, a procedure is similar to a procedure before data transmission is started in the electronic devices 515T (electronic devices 515-1 and 515-2) serving as transmitters of the electronic system 500 in FIG. 14 (see the flowchart of FIG. 18). The detailed description of the procedure is omitted.

Moreover, in this case, before data reception is started in the electronic device electronic device 615R (electronic device 615-2) serving as a receiver, a procedure is similar to a procedure before data reception is started in the electronic device 515R (electronic device 515-3) serving as a receiver of the electronic system 500 in FIG. 14 (see the flowchart of FIG. 16). The detailed description of the procedure is omitted.

Figure 24:
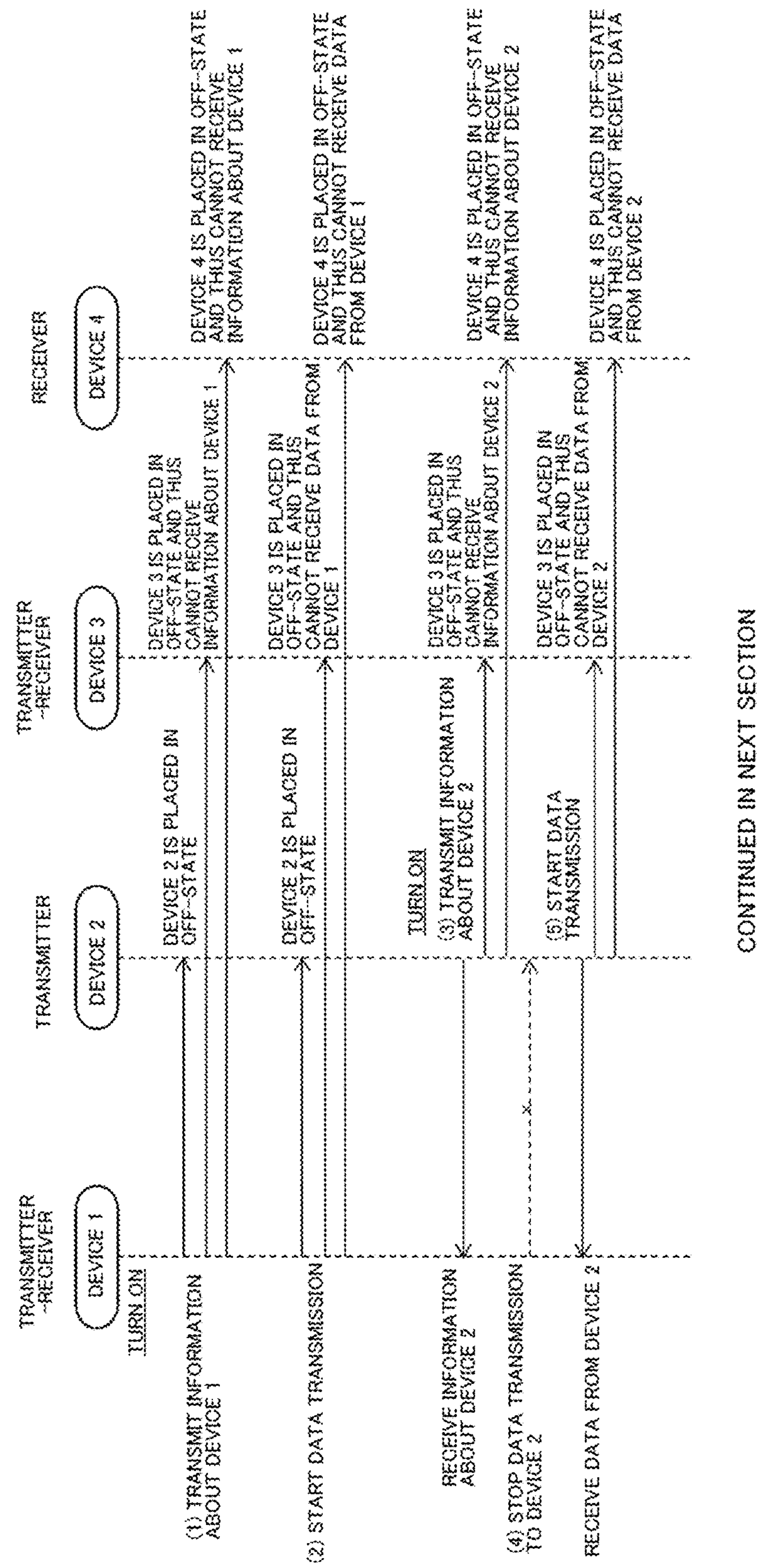
FIG. 24 is a sequence diagram showing an example of exchange of information before device-to-device communications are started.
Figure 25:
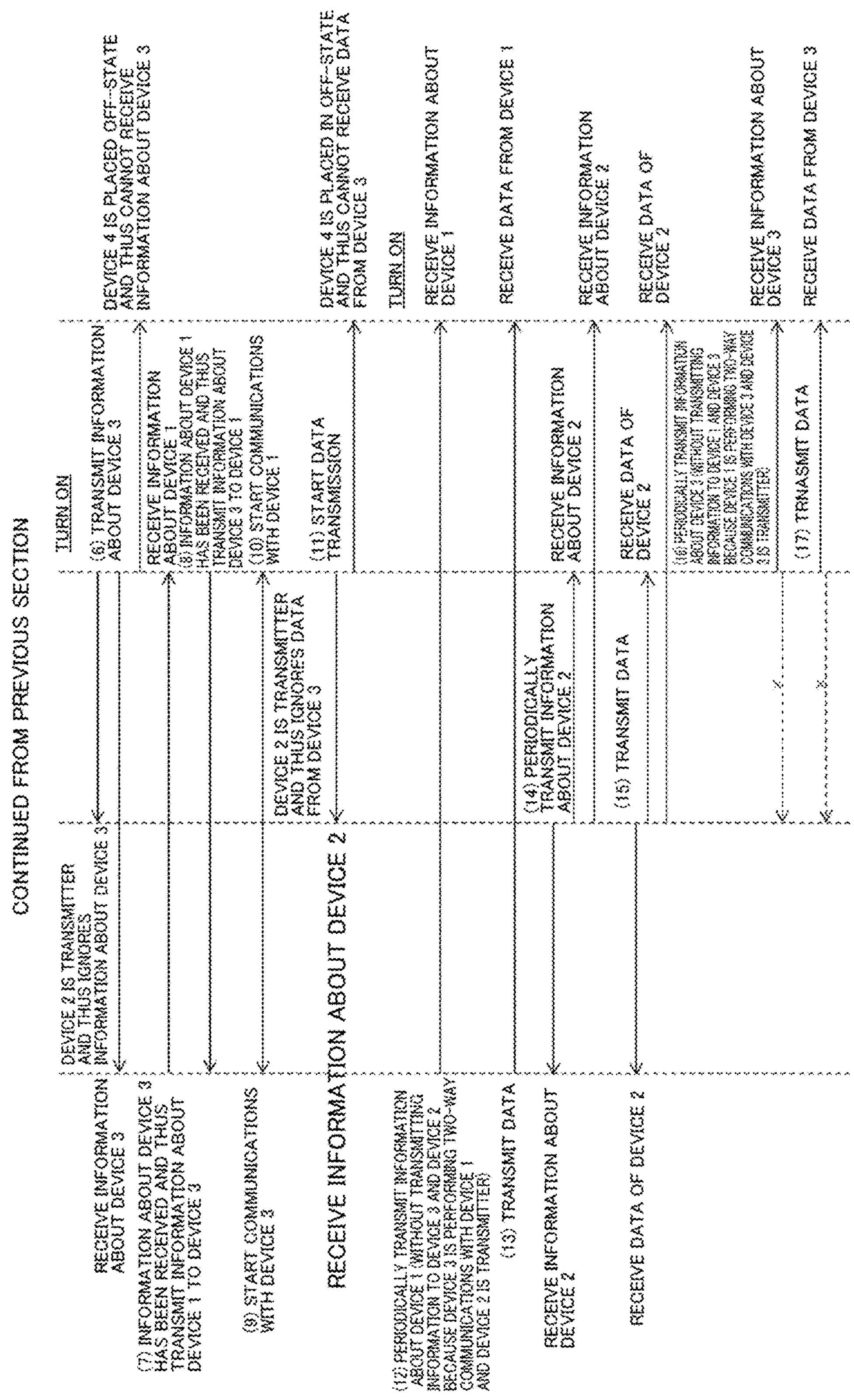
FIG. 25 is a sequence diagram showing an example of exchange of information before device-to-device communications are started.

The sequence diagrams of FIGS. 24 and 25 show an example of exchange of information before device-to-device communications are started, in the flowcharts of FIGS. 21, 18, and 16 showing the procedure before data transmission or data reception is started in each device. The sequence diagrams are intended to represent the case where the device 2, the device 3, and the device 4 are turned on in this order after the device 1 is turned on.

(1) First, the device 1 transmits information about the device 1 (device) after being turned on. In this case, the device 2 is placed in an off-state. The device 3 and the device 4 are placed in an off-state and thus cannot receive the information about the device 1. (2) The device 1 then starts data transmission. In this case, the device 2 is placed in an off-state. The device 3 and the device 4 are placed in an off-state and thus cannot receive the data from the device 1. Thereafter, the device 2 is supposed to be turned on.

(3) Subsequently, the device 2 transmits information about the device 2 (device). In this case, the device 1 receives the information about the device 2. The device 3 and the device 4 are placed in an off-state and thus cannot receive the information about the device 2. (4) The device 1 having received the information about the device 2 determines that the device 2 is a transmitter, and stops data transmission to the device 2. (5) The device 2 then starts data transmission. In this case, the device 1 receives the data from the device 2. The device 3 and the device 4 are placed in an off-state and thus cannot receive the data from the device 2. Thereafter, the device 3 is supposed to be turned on.

(6) Subsequently, the device 3 transmits information about the device 3 (device). In this case, the device 1 receives the information about the device 3. The device 2 is a transmitter and thus ignores the information about the device 3. The device 4 is placed in an off-state and thus cannot receive the information about the device 3.

(7) The device 1 having received the information about the device 3 transmits information about the device 1 to the device 3. In this case, the device 3 receives the information about the device 1. (8) The device 3 having received the information about the device 1 transmits information about the device 3 to the device 1. (9)(10) Thus, two-way communications are started between the device 1 and the device 3.

(11) Thereafter, the device 3 starts data transmission. In this case, the device 1 has already started communications with the device 3 and thus receives data from the device 3. The device 2 is a transmitter and thus ignores the data from the device 3. The device 4 is placed in an off-state and thus cannot receive the data from the device 3. Thereafter, the device 4 is supposed to be turned on.

(12) Subsequently, the device 1 periodically transmits information about the device 1 (device). In this case, the device 1 does not transmit the information about the device 1 to the device 3 and the device 2 because the device 3 is performing two-way communications with the device 1 and the device 2 is a transmitter. The device 4 receives the information about the device 1. (13) The device 1 then transmits data. In this case, the device 2 is a transmitter and thus the device 1 does not transmit the data to the device 2. The device 4 receives the data from the device 1. The device 3 in two-way communications also receives the data from the device 1.

(14) The device 2 then periodically transmits information about the device 2 (device). In this case, the device 1, the device 3, and the device 4 receive the information about the device 2. (15) The device 2 then transmits data. In this case, the device 1, the device 3, and the device 4 receive the data from the device 2.

(16) Subsequently, the device 3 periodically transmits information about the device 3 (device). In this case, the device 3 does not transmit the information about the device 3 to the device 1 and the device 2 because the device 1 is performing two-way communications with the device 3 and the device 2 is a transmitter. (17) The device 3 then transmits data. In this case, the device 2 is a transmitter and thus the device 3 does not transmit the data to the device 2. The device 4 receives the data from the device 3. The device 1 in two-way communications also receives the data from the device 3.

In the transmission system 600 in FIG. 20, as in the transmission system 100 in FIG. 5, some of the channels of the terminal A are shifted and directly connected to some of the channels of the terminal B via the optical fibers and the transmitting circuits or receiving circuits are connected to other channels of the terminal A and other channels of the terminal B in each of the electronic devices. This can properly make a signal connection between the electronic devices to make a daisy chain connection. Furthermore, even if another electronic device is present between the electronic devices to make a signal connection and the electronic devices are turned off, a signal connection can be made without causing any problems. For example, even if the electronic device 615-2 (device 2) and the electronic device 615-3 (device 3) are turned off, a signal connection can be made between the electronic device 615-1 (device 1) and the electronic device 615-4 (device 4).

In the transmission system 600 in FIG. 20, the electronic device 615-1 (device 1) serving as a transmitter-receiver, the electronic device 615-2 (device 2) serving as a transmitter, the electronic device 615-3 (device 3) serving as a transmitter-receiver, and the electronic device 615-4 (device 4) serving as a receiver are connected in this order. The electronic devices similarly operate even when connected in a different order. In other words, the electronic devices can be connected in any order to perform necessary signal communications regardless of whether the electronic devices are transmitter-receivers, transmitters, or receivers.

Seventh Embodiment

Figure 26:
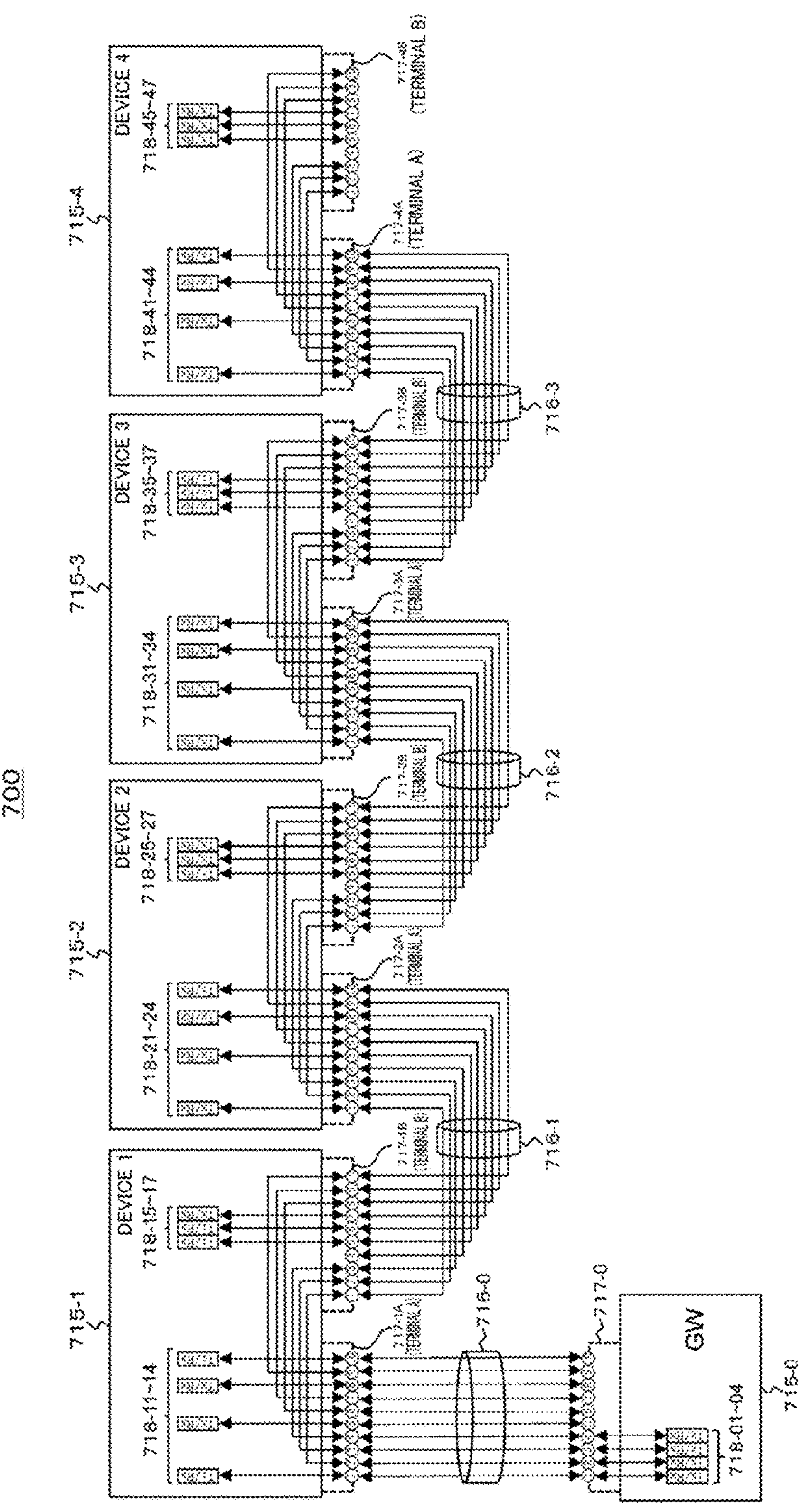
FIG. 26 illustrates a configuration example of a transmission system as a seventh embodiment.

FIG. 26 illustrates a configuration example of a transmission system 700 as a seventh embodiment. The transmission system 700 is configured with four electronic devices 715-1 to 715-4 making a daisy chain connection to a specific electronic device (hereinafter referred to as "specific device") 715-0. In this example, the electronic devices 715-1 to 715-4 each constitute a transmitter-receiver.

The specific device 715-0 is supposed to make a signal connection to each of the electronic devices 715-1 to 715-4. The specific device 715-0 is, for example, a gateway (GW). The specific device 715-0 is provided with a terminal 717-0. The terminal 717-0 has ten channels: channels 1 to 10. In the device, transmit/receive circuits 718-01 to 718-04 are respectively connected to the channels 1, 2, 3, and 4 of the terminal 717-0.

The electronic device 715-1 (device 1) is provided with a terminal 717-1A (terminal A) and a terminal 717-1B (terminal B) for daisy chain connection. The terminals 717-1A and 717-1B each have ten channels: channels 1 to 10. In the device, some of the channels of the terminal 717-1A are shifted and directly connected to some of the channels of the terminal 717-1B via optical fibers. Transmit/receive circuits (Tx/Rx) are connected to other channels of the terminal 717-1A and other channels of the terminal 717-1B.

In this configuration, the channels 2, 3, 4, 6, 7, and 9 of the terminal 717-1A are directly connected respectively to the channels 1, 2, 3, 8, 9, and 10 of the terminal 717-1B. Furthermore, transmit/receive circuits 718-11 to 718-14 are respectively connected to the channels 1, 5, 8, and 10 of the terminal 717-1A, and transmit/receive circuits 718-15 to 718-17 are respectively connected to the channels 5, 6, and 7 of the terminal 717-1B.

The electronic device 715-2 (device 2) is provided with a terminal 717-2A (terminal A) and a terminal 717-2B (terminal B) for daisy chain connection. The terminals 717-2A and 717-2B each have ten channels: channels 1 to 10. In the device, some of the channels of the terminal 717-2A are shifted and directly connected to some of the channels of the terminal 717-2B via optical fibers. Transmit/receive circuits (Tx/Rx) are connected to other channels of the terminal 717-2A and other channels of the terminal 717-2B.

In this configuration, the channels 2, 3, 4, 6, 7, and 9 of the terminal 717-2A are directly connected respectively to the channels 1, 2, 3, 8, 9, and 10 of the terminal 717-2B. Furthermore, transmit/receive circuits 718-21 to 718-24 are respectively connected to the channels 1, 5, 8, and 10 of the terminal 717-2A, and transmit/receive circuits 718-25 to 718-27 are respectively connected to the channels 5, 6, and 7 of the terminal 717-2B.

The electronic device 715-3 (device 3) is provided with a terminal 717-3A (terminal A) and a terminal 717-3B (terminal B) for daisy chain connection. The terminals 717-3A and 717-3B each have ten channels: channels 1 to 10. In the device, some of the channels of the terminal 717-3A are shifted and directly connected to some of the channels of the terminal 717-3B via optical fibers. Transmit/receive circuits (Tx/Rx) are connected to other channels of the terminal 717-3A and other channels of the terminal 717-3B.

In this configuration, the channels 2, 3, 4, 6, 7, and 9 of the terminal 717-3A are directly connected respectively to the channels 1, 2, 3, 8, 9, and 10 of the terminal 717-3B. Furthermore, transmit/receive circuits 718-31 to 718-34 are respectively connected to the channels 1, 5, 8, and 10 of the terminal 717-3A, and transmit/receive circuits 718-35 to 718-37 are respectively connected to the channels 5, 6, and 7 of the terminal 717-3B.

The electronic device 715-4 (device 4) is provided with a terminal 717-4A (terminal A) and a terminal 717-4B (terminal B) for daisy chain connection. The terminals 717-4A and 717-4B each have ten channels: channels 1 to 10. In the device, some of the channels of the terminal 717-4A are shifted and directly connected to some of the channels of the terminal 717-4B via optical fibers. Transmit/receive circuits (Tx/Rx) are connected to other channels of the terminal 717-4A and other channels of the terminal 717-4B.

In this configuration, the channels 2, 3, 4, 6, 7, and 9 of the terminal 717-4A are directly connected respectively to the channels 1, 2, 3, 8, 9, and 10 of the terminal 717-4B. Furthermore, transmit/receive circuits 718-41 to 718-44 are respectively connected to the channels 1, 5, 8, and 10 of the terminal 717-4A, and transmit/receive circuits 718-45 to 718-47 are respectively connected to the channels 5, 6, and 7 of the terminal 717-4B.

The channels 1 to 10 of the terminal 717-0 of the specific device 715-0 are respectively connected to the channels 1 to 10 of the terminal 717-1A of the electronic device 715-1 via a ten-core optical cable 716-0. The channels 1 to 10 of the terminal 717-1B of the electronic device 715-1 are respectively connected to the channels 1 to 10 of the terminal 717-2A of the electronic device 715-2 via a ten-core optical cable 716-1. The channels 1 to 10 of the terminal 717-2B of the electronic device 715-2 are respectively connected to the channels 1 to 10 of the terminal 717-3A of the electronic device 715-3 via a ten-core optical cable 716-2. The channels 1 to 10 of the terminal 717-3B of the electronic device 715-3 are respectively connected to the channels 1 to 10 of the terminal 717-4A of the electronic device 715-4 via a ten-core optical cable 716-3.

In this case, the transmit/receive circuit 718-01 of the specific device 715-0 is connected to the transmit/receive circuit 718-11 of the electronic device 715-1 via a path including the channel 1 of the terminal 717-0, the optical cable 716-0, and the channel 1 of the terminal 717-1A.

The transmit/receive circuit 718-02 of the specific device 715-0 is connected to the transmit/receive circuit 718-21 of the electronic device 715-2 via a path including the channel 2 of the terminal 717-0, the optical cable 716-0, the channel 2 of the terminal 717-1A, the optical fiber (internal wiring), the channel 1 of the terminal 717-1B, the optical cable 716-1, and the channel 1 of the terminal 717-2A.

The transmit/receive circuit 718-03 of the specific device 715-0 is connected to the transmit/receive circuit 718-31 of the electronic device 715-3 via a path including the channel 3 of the terminal 717-0, the optical cable 716-0, the channel 3 of the terminal 717-1A, the optical fiber (internal wiring), the channel 2 of the terminal 717-1B, the optical cable 716-1, the channel 2 of the terminal 717-2A, the optical fiber (internal wiring), the channel 1 of the terminal 717-2B, the optical cable 716-2, and the channel 1 of the terminal 717-3A.

The transmit/receive circuit 718-04 of the specific device 715-0 is connected to the transmit/receive circuit 718-41 of the electronic device 715-4 via a path including the channel 4 of the terminal 717-0, the optical cable 716-0, the channel 4 of the terminal 717-1A, the optical fiber (internal wiring), the channel 3 of the terminal 717-1B, the optical cable 716-1, the channel 3 of the terminal 717-2A, the optical fiber (internal wiring), the channel 2 of the terminal 717-2B, the optical cable 716-2, the channel 2 of the terminal 717-3A, the optical fiber (internal wiring), the channel 1 of the terminal 717-3B, the optical cable 716-3, and the channel 1 of the terminal 717-4A.

Furthermore, the transmit/receive circuit 718-15 of the electronic device 715-1 is connected to the transmit/receive circuit 718-22 of the electronic device 715-2 via a path including the channel 5 of the terminal 717-1B, the optical cable 716-1, and the channel 5 of the terminal 717-2A.

The transmit/receive circuit 718-16 of the electronic device 715-1 is connected to the transmit/receive circuit 718-33 of the electronic device 715-3 via a path including the channel 6 of the terminal 717-1B, the optical cable 716-1, the channel 6 of the terminal 717-2A, the optical fiber (internal wiring), the channel 8 of the terminal 717-2B, the optical cable 716-2, and the channel 8 of the terminal 717-3A.

The transmit/receive circuit 718-17 of the electronic device 715-1 is connected to the transmit/receive circuit 718-44 of the electronic device 715-4 via a path including the channel 7 of the terminal 717-1B, the optical cable 716-1, the channel 7 of the terminal 717-2A, the optical fiber (internal wiring), the channel 9 of the terminal 717-2B, the optical cable 716-2, the channel 9 of the terminal 717-3A, the optical fiber (internal wiring), the channel 10 of the terminal 717-3B, the optical cable 716-3, and the channel 10 of the terminal 717-4A.

Furthermore, the transmit/receive circuit 718-25 of the electronic device 715-2 is connected to the transmit/receive circuit 718-32 of the electronic device 715-3 via a path including the channel 5 of the terminal 717-2B, the optical cable 716-2, and the channel 5 of the terminal 717-3A.

The transmit/receive circuit 718-26 of the electronic device 715-2 is connected to the transmit/receive circuit 718-43 of the electronic device 715-4 via a path including the channel 6 of the terminal 717-2B, the optical cable 716-2, the channel 6 of the terminal 717-3A, the optical fiber (internal wiring), the channel 8 of the terminal 717-3B, the optical cable 716-3, and the channel 8 of the terminal 717-4A.

Furthermore, the transmit/receive circuit 718-35 of the electronic device 715-3 is connected to the transmit/receive circuit 718-42 of the electronic device 715-4 via a path including the channel 5 of the terminal 717-3B, the optical cable 716-3, and the channel 5 of the terminal 717-4A.

In the transmission system 700 in FIG. 26, some of the channels of the terminal A are shifted and directly connected to some of the channels of the terminal B via the optical fibers and the transmit/receive circuits are connected to other channels of the terminal A and other channels of the terminal B in each of the electronic devices 715-1 to 715-4. This can properly make a signal connection between the specific device 715-0 and the electronic devices 715-1 to 715-4 and a signal connection among the electronic devices 715-1 to 715-4. Furthermore, even if another electronic device is present between the electronic devices to make a signal connection and the electronic devices are turned off, a signal connection can be made without causing any problems.

In the transmission system 700 in FIG. 26, the five electronic devices including the specific device 715-0 are provided in daisy chain connection. This configuration can reduce the number of transmit/receive circuits included in each of the electronic devices 715-1 to 715-4 as compared with the transmission system 300 in FIG. 11. Specifically, in the transmission system 300 in FIG. 11, each of the electronic devices 315-1 to 315-5 includes the eight transmit/receive circuits. In the transmission system 700 in FIG. 26, each of the electronic devices 715-1 to 715-4 only needs the seven transmit/receive circuits.

As described above, the transmission system 700 in FIG. 26 is configured with the four electronic devices 715-1 to 715-4 making a daisy chain connection to the specific device 715-0. Also in the case of any other number of electronic devices to make a daisy connection to the specific device, the transmission system can be similarly configured. A detailed description thereof is omitted.

In the case of n electronic devices in a daisy connection to the specific device, it is typically assumed that the electronic devices each include $(n-1)*2+1$ transmit/receive circuits and two terminals, each having $n*(n+1)/2$ channels. The electronic devices are connected via $(n-1)$ cables, making a signal connection between the devices.

FIG. 27 shows the correspondence relationship among the number of electronic devices (the number of connected devices), the total number of optical cables (the total number of cables), the number of terminals (the number of device terminals), the number of transmit/receive circuits (the number of Tx/Rx), and the number of terminal channels (the number of Ch). When the number of electronic devices is n, the total number of optical cables is $(n-1)$, the number of terminals is 2, the number of transmit/receive circuits is $(n-1)*2+1$, and the number of terminal channels is $n*(n+1)/2$.

Eighth Embodiment

Figure 28:
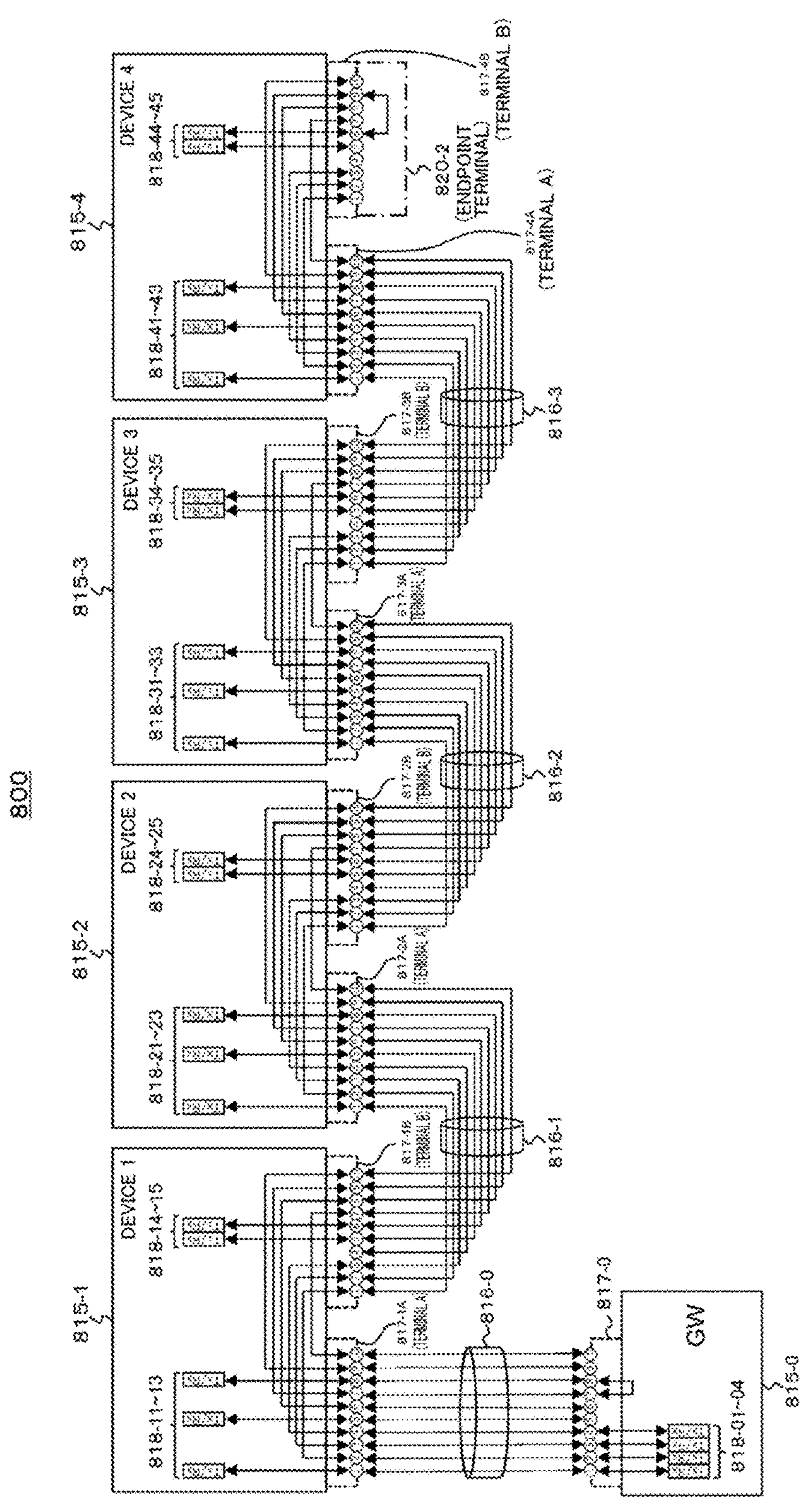
FIG. 28 illustrates a configuration example of a transmission system as an eighth embodiment.

FIG. 28 illustrates a configuration example of a transmission system 800 as an eighth embodiment. The transmission system 800 is configured with four electronic devices 815-1 to 815-4 making a daisy chain connection to a specific electronic device (hereinafter referred to as "specific device") 815-0. In this example, the electronic devices 815-1 to 815-4 each constitute a transmitter-receiver.

The specific device 815-0 is supposed to make a signal connection to each of the electronic devices 815-1 to 815-4. The specific device 815-0 is, for example, a gateway (GW). The specific device 815-0 is provided with a terminal 817-0. The terminal 817-0 has ten channels: channels 1 to 10. In the device, transmit/receive circuits 818-01 to 818-04 are respectively connected to the channels 1, 2, 3, and 4 of the terminal 817-0. The unused channels 7 and 8 of the terminal 817-0 are directly connected to each other via an optical fiber.

The electronic device 815-1 (device 1) is provided with a terminal 817-1A (terminal A) and a terminal 817-1B (terminal B) for daisy chain connection. The terminals 817-1A and 817-1B each have ten channels: channels 1 to 10. In the device, some of the channels of the terminal 817-1A are shifted and directly connected to some of the channels of the terminal 817-1B via optical fibers. Transmit/receive circuits (Tx/Rx) are connected to other channels of the terminal 817-1A and other channels of the terminal 817-1B.

In this configuration, the channels 2, 3, 4, 6, 7, 9, and 10 of the terminal 817-1A are directly connected respectively to the channels 1, 2, 3, 8, 9, 10, and 7 of the terminal 817-1B. Furthermore, transmit/receive circuits 818-11 to 818-13 are respectively connected to the channels 1, 5, and 8 of the terminal 817-1A, and transmit/receive circuits 818-14 and 818-15 are respectively connected to the channels 5 and 6 of the terminal 817-1B.

The electronic device 815-2 (device 2) is provided with a terminal 817-2A (terminal A) and a terminal 817-2B (terminal B) for daisy chain connection. The terminals 817-2A and 817-2B each have ten channels: channels 1 to 10. In the device, some of the channels of the terminal 817-2A are shifted and directly connected to some of the channels of the terminal 817-2B via optical fibers. Transmit/receive circuits (Tx/Rx) are connected to other channels of the terminal 817-2A and other channels of the terminal 817-2B.

In this configuration, the channels 2, 3, 4, 6, 7, 9, and 10 of the terminal 817-2A are directly connected respectively to the channels 1, 2, 3, 8, 9, 10, and 7 of the terminal 817-2B. Furthermore, transmit/receive circuits 818-21 to 818-23 are respectively connected to the channels 1, 5, and 8 of the terminal 817-2A, and transmit/receive circuits 818-24 and 818-25 are respectively connected to the channels 5 and 6 of the terminal 817-2B.

The electronic device 815-3 (device 3) is provided with a terminal 817-3A (terminal A) and a terminal 817-3B (terminal B) for daisy chain connection. The terminals 817-3A and 817-3B each have ten channels: channels 1 to 10. In the device, some of the channels of the terminal 817-3A are shifted and directly connected to some of the channels of the terminal 817-3B via optical fibers. Transmit/receive circuits (Tx/Rx) are connected to other channels of the terminal 817-3A and other channels of the terminal 817-3B.

In this configuration, the channels 2, 3, 4, 6, 7, 9, and 10 of the terminal 817-3A are directly connected respectively to the channels 1, 2, 3, 8, 9, 10, and 7 of the terminal 817-3B. Furthermore, transmit/receive circuits 818-31 to 818-33 are respectively connected to the channels 1, 5, and 8 of the terminal 817-3A, and transmit/receive circuits 818-34 and 818-35 are respectively connected to the channels 5 and 6 of the terminal 817-3B.

The electronic device 815-4 (device 4) is provided with a terminal 817-4A (terminal A) and a terminal 817-4B (terminal B) for daisy chain connection. The terminals 817-4A and 817-4B each have ten channels: channels 1 to 10. In the device, some of the channels of the terminal 817-4A are shifted and directly connected to some of the channels of the terminal 817-4B via optical fibers. Transmit/receive circuits (Tx/Rx) are connected to other channels of the terminal 817-4A and other channels of the terminal 817-4B.

In this configuration, the channels 2, 3, 4, 6, 7, 9, and 10 of the terminal 817-4A are directly connected respectively to the channels 1, 2, 3, 8, 9, 10, and 7 of the terminal 817-4B. Furthermore, transmit/receive circuits 818-41 to 818-43 are respectively connected to the channels 1, 5, and 8 of the terminal 817-4A, and transmit/receive circuits 818-44 and 818-45 are respectively connected to the channels 5 and 6 of the terminal 817-4B.

The channels 1 to 10 of the terminal 817-0 of the specific device 815-0 are respectively connected to the channels 1 to 10 of the terminal 817-1A of the electronic device 815-1 via a ten-core optical cable 816-0. The channels 1 to 10 of the terminal 817-1B of the electronic device 815-1 are respectively connected to the channels 1 to 10 of the terminal 817-2A of the electronic device 815-2 via a ten-core optical cable 816-1. The channels 1 to 10 of the terminal 817-2B of the electronic device 815-2 are respectively connected to the channels 1 to 10 of the terminal 817-3A of the electronic device 815-3 via a ten-core optical cable 816-2. The channels 1 to 10 of the terminal 817-3B of the electronic device 815-3 are respectively connected to the channels 1 to 10 of the terminal 817-4A of the electronic device 815-4 via a ten-core optical cable 816-3.

In addition, an endpoint terminal 820-2 is connected to the terminal 817-4B, to which an optical cable is unconnected, on the electronic device 815-4 located on the right end. The endpoint terminal 820-2 directly connects the channel 6 and the channel 9 of the terminal 817-4B via an optical fiber.

In this case, the transmit/receive circuit 818-01 of the specific device 815-0 is connected to the transmit/receive circuit 818-11 of the electronic device 815-1 via a path including the channel 1 of the terminal 817-0, the optical cable 816-0, and the channel 1 of the terminal 817-1A.

The transmit/receive circuit 818-02 of the specific device 815-0 is connected to the transmit/receive circuit 818-21 of the electronic device 815-2 via a path including the channel 2 of the terminal 817-0, the optical cable 816-0, the channel 2 of the terminal 817-1A, the optical fiber (internal wiring), the channel 1 of the terminal 817-1B, the optical cable 816-1, and the channel 1 of the terminal 817-2A.

The transmit/receive circuit 818-03 of the specific device 815-0 is connected to the transmit/receive circuit 818-31 of the electronic device 815-3 via a path including the channel 3 of the terminal 817-0, the optical cable 816-0, the channel 3 of the terminal 817-1A, the optical fiber (internal wiring), the channel 2 of the terminal 817-1B, the optical cable 816-1, the channel 2 of the terminal 817-2A, the optical fiber (internal wiring), the channel 1 of the terminal 817-2B, the optical cable 816-2, and the channel 1 of the terminal 817-3A.

The transmit/receive circuit 818-04 of the specific device 815-0 is connected to the transmit/receive circuit 818-41 of the electronic device 815-4 via a path including the channel 4 of the terminal 817-0, the optical cable 816-0, the channel 4 of the terminal 817-1A, the optical fiber (internal wiring), the channel 3 of the terminal 817-1B, the optical cable 816-1, the channel 3 of the terminal 817-2A, the optical fiber (internal wiring), the channel 2 of the terminal 817-2B, the optical cable 816-2, the channel 2 of the terminal 817-3A, the optical fiber (internal wiring), the channel 1 of the terminal 817-3B, the optical cable 816-3, and the channel 1 of the terminal 817-4A.

Furthermore, the transmit/receive circuit 818-14 of the electronic device 815-1 is connected to the transmit/receive circuit 818-22 of the electronic device 815-2 via a path including the channel 5 of the terminal 817-1B, the optical cable 816-1, and the channel 5 of the terminal 817-2A.

The transmit/receive circuit 818-15 of the electronic device 815-1 is connected to the transmit/receive circuit 818-33 of the electronic device 815-3 via a path including the channel 6 of the terminal 817-1B, the optical cable 816-1, the channel 6 of the terminal 817-2A, the optical fiber (internal wiring), the channel 8 of the terminal 817-2B, the optical cable 816-2, and the channel 8 of the terminal 817-3A.

The transmit/receive circuit 818-13 of the electric device 815-1 is connected to the transmit/receive circuit 718-45 of the electronic device 815-4 via a path including the channel 8 of the terminal 817-1A, the optical cable 816-0, the channel 8 of the terminal 817-0, the optical fiber (internal wiring), the channel 7 of the terminal 817-0, the optical cable 816-0, the channel 7 of the terminal 817-1A, the optical fiber (internal wiring), the channel 9 of the terminal 817-1B, the optical cable 816-1, the channel 9 of the terminal 817-2A, the optical fiber (internal wiring), the channel 10 of the terminal 817-2B, the optical cable 816-2, the channel 10 of the terminal 817-3A, the optical fiber (internal wiring), the channel 7 of the terminal 817-3B, the optical cable 816-3, the channel 7 of the terminal 817-4A, the optical fiber (internal wiring), the channel 9 of the terminal 817-4B, the optical fiber (internal wiring), and the channel 6 of the terminal 817-4B.

Furthermore, the transmit/receive circuit 818-24 of the electronic device 815-2 is connected to the transmit/receive circuit 818-32 of the electronic device 815-3 via a path including the channel 5 of the terminal 817-2B, the optical cable 816-2, and the channel 5 of the terminal 817-3A.

The transmit/receive circuit 818-25 of the electronic device 815-2 is connected to the transmit/receive circuit 818-43 of the electronic device 815-4 via a path including the channel 6 of the terminal 817-2B, the optical cable 816-2, the channel 6 of the terminal 817-3A, the optical fiber (internal wiring), the channel 8 of the terminal 817-3B, the optical cable 816-3, and the channel 8 of the terminal 817-4A.

Furthermore, the transmit/receive circuit 818-34 of the electronic device 815-3 is connected to the transmit/receive circuit 818-42 of the electronic device 815-4 via a path including the channel 5 of the terminal 817-3B, the optical cable 816-3, and the channel 5 of the terminal 817-4A.

In the transmission system 800 in FIG. 28, some of the channels of the terminal A are shifted and directly connected to some of the channels of the terminal B via the optical fibers and the transmit/receive circuits are connected to other channels of the terminal A and other channels of the terminal B in each of the electronic devices 815-1 to 815-4. This can properly make a signal connection between the specific device 815-0 and the electronic devices 815-1 to 815-4 and a signal connection among the electronic devices 815-1 to 815-4. Furthermore, even if another electronic device is present between the electronic devices to make a signal connection and the electronic devices are turned off, a signal connection can be made without causing any problems.

In the transmission system 800 in FIG. 28, an endpoint terminal 820-2 for directly connecting specific channels is connected to the terminal B, to which the cable is unconnected, on the electronic device 815-4 located on the side opposite to the specific device 815-0 among the electronic devices 415-1 to 415-4 making a daisy chain connection to the specific device 815-0. Furthermore, the specific unused channels of the terminal 817-0 of the specific device 815-0 are directly connected to each other. This configuration can reduce the number of transmit/receive circuits in each of the electronic devices. In this case, the endpoint terminal 820-2 is connected to form a loop of a path, achieving efficient use of the transmit/receive circuits. In the transmission system 700 in FIG. 26, each of the electronic devices 715-1 to 715-4 needs to have the seven transmit/receive circuits. In the transmission system 800 in FIG. 28, each of the electronic devices 815-1 to 815-4 only needs the five transmit/receive circuits.

The transmission system 800 in FIG. 28 is configured with the four electronic devices 815-1 to 815-4 making a daisy chain connection to the specific device 815-0. Also in the case of any other number of electronic devices to make a daisy connection to the specific device, the number of transmit/receive circuits can be similarly reduced by using endpoint terminals or the like. A detailed description of the configuration is omitted.

2. Modification Example

In the foregoing embodiments, examples of an optical interface were described. The present technique is also similarly applicable to an electric interface.

Although preferred embodiments of the present disclosure have been described in detail with reference to the accompanying drawings as described above, the technical scope of the present disclosure is not limited to such examples. It is apparent that those having ordinary knowledge in the technical field of the present disclosure could conceive various modified examples or changed examples within the scope of the technical ideas set forth in the claims, and it should be understood that these also naturally fall within the technical scope of the present disclosure.

Furthermore, the effects described in the present specification are merely explanatory or exemplary and are not intended as limiting. That is, the techniques according to the present disclosure may exhibit other effects apparent to those skilled in the art from the description herein, in addition to or in place of the above effects.

The present technique can also have the following configurations.

(1) An electronic device including a first terminal and a second terminal for daisy chain connection, the first terminal and the second terminal each have a plurality of channels, and some of the channels of the first terminal are shifted and directly connected to some of the channels of the second terminal in the device.

(2) The electronic device according to (1), wherein communication circuits are connected to other channels of the first terminal and other channels of the second terminal.

(3) The electronic device according to (2), wherein the communication circuit is a transmit/receive circuit, a transmitting circuit, or a receiving circuit.

(4) The electronic device according to (3), wherein the communication circuit is a transmit/receive circuit, and the communication circuit transmits information about the device after being turned on, and starts transmission and reception of data to and from other devices after receiving information about the other devices.

(5) The electronic device according to (3), wherein the communication circuit is a transmit/receive circuit, and the communication circuit transmits information about the device after being turned on, and starts transmission and reception of data to and from other devices after transmitting the information about the device.

(6) The electronic device according to (3), wherein the communication circuit is a transmit/receive circuit, and the communication circuit transmits information about the device and then starts data transmission after being turned on, receives information about other devices, starts data reception from the other devices if the other devices are transmitter-receivers, and starts data reception from the other devices after stopping data transmission to the other devices if the other devices are transmitters.

(7) The electronic device according to (3), wherein the communication circuit is a transmit/receive circuit, and the communication circuit starts data transmission after being turned on to transmit information about the device, periodically transmits the information about the device during intervals between the data transmissions, receives information about other devices, starts data reception from the other devices after transmitting the information about the device to the other devices if the other devices are transmitter-receivers, and starts data reception from the other devices after stopping the transmission of the information about the device and data to the other devices if the other devices are transmitters.

(8) The electronic device according to (3), wherein the communication circuit is a transmitting circuit, and the communication circuit starts data transmission after being turned on to transmit information about the device.

(9) The electronic device according to (3), wherein the communication circuit is a transmitting circuit, and the communication circuit starts data transmission after being turned on to transmit information about the device, and periodically transmits the information about the device during intervals between the data transmissions.

(10) The electronic device according to (3), wherein the communication circuit is a receiving circuit, and the communication circuit starts data reception from other devices after being turned on to receive information about the other devices.

(11) The electronic device according to any one of (1) to (10), wherein the first terminal and the second terminal each have n*(n−1)/2 channels to allow a daisy chain connection of n electronic devices including the device.

(12) The electronic device according to (11), wherein the communication circuits are connected to (n−1) channels constituting other channels of the n*(n−1)/2 channels of the first terminal, and the communication circuits are connected to (n−1) channels constituting other channels of the n*(n−1)/2 channels of the second terminal.

(13) The electronic device according to any one of (1) to (10), wherein the first terminal and the second terminal each have n*(n+1)/2 channels to allow a daisy chain connection of n electronic devices including the device to a specific device.

(14) The electronic device according to (13), wherein the communication circuits are connected to n channels constituting other channels of the n*(n+1)/2 channels of the first terminal, and the communication circuits are connected to (n−1) channels constituting other channels of the n*(n+1)/2 channels of the second terminal.

(15) A transmission system configured with a plurality of electronic devices in daisy chain connection via cables, wherein the electronic device includes a first terminal and a second terminal for daisy chain connection, the first terminal and the second terminal each have a plurality of channels, and some of the channels of the first terminal are shifted and directly connected to some of the channels of the second terminal in the device.

(16) The transmission system according to (15), wherein communication circuits are connected to other channels of the first terminal and other channels of the second terminal.

(17) The transmission system according to (15) or (16), wherein an endpoint terminal for connecting specific channels is connected to the first terminal or the second terminal, to which the cable is unconnected, on the electronic devices on both ends among the plurality of electronic devices in daisy chain connection.

(18) A transmission system configured with a plurality of electronic devices in daisy chain connection to a specific device via cables, wherein the electronic device includes a first terminal and a second terminal for daisy chain connection, the first terminal and the second terminal each have a plurality of channels, and some of the channels of the first terminal are shifted and directly connected to some of the channels of the second terminal in the device.

(19) The transmission system according to (18), wherein communication circuits are connected to other channels of the first terminal and other channels of the second terminal.

(20) The transmission system according to (18) or (19), wherein an endpoint terminal for connecting specific channels is connected to the second terminal, to which the cable is unconnected, on an end opposite to the specific device of the plurality of electronic devices in daisy chain connection.

REFERENCE SIGNS LIST

100 Transmission system
115-1 to 115-4 Electronic device
116-1 to 116-3 Optical cable
117-1A to 117-4A, 117-1B to 117-4B Terminal
118-11 to 118-16, 118-21 to 118-26, 118-31 to 118-36, 118-41 to 118-46 Transmit/receive circuit
200 Transmission system
215-1 to 215-3 Electronic device
216-1 and 216-2 Optical cable
217-1A to 217-3A, 217-1B to 217-3B Terminal
218-11 to 218-14, 218-21 to 218-24, 218-31 to 218-34 Transmit/receive circuit
300 Transmission system
315-1 to 315-5 Electronic device
316-1 to 316-4 Optical cable
317-1A to 317-5A, 317-1B to 317-5B Terminal
318-11 to 318-18, 318-21 to 318-28, 318-31 to 318-38, 318-41 to 318-48, 318-51 to 318-58 Transmit/receive circuit
400 Transmission system
415-1 to 415-4 Electronic device
416-1 to 416-3 Optical cable
417-1A to 417-4A, 417-1B to 417-4B Terminal
418-11 to 418-14, 418-21 to 418-24, 418-31 to 418-34, 418-41 to 418-44 Transmit/receive circuit
420-1, 420-2 Endpoint terminal
500 Transmission system
515-1 to 515-3 Electronic device
516-1 and 516-2 Optical cable
517-1A to 517-3A, 517-1B to 517-3B Terminal
518-11 to 518-14, 518-21 to 518-24 Transmitting circuit
518-31 to 518-34 Receiving circuit
600 Transmission system

615-1 to 615-4 Electronic device
616-1 to 616-3 Optical cable
617-1A to 617-4A, 617-1B to 617-4B Terminal
618-11 to 618-16, 618-31 to 618-36 Transmit/receive circuit
618-21 to 618-26 Transmitting circuit
618-41 to 618-46 Receiving circuit
700 Transmission system
715-0 Electronic device (specific device)
715-1 to 715-4 Electronic device
716-0 to 716-3 Optical cable
717-0, 717-1A to 717-4A, 717-1B to 717-4B Terminal
718-01 to 718-04, 718-11 to 718-17, 718-21 to 718-27, 718-31 to 718-37, 718-41 to 718-47 Transmit/receive circuit
800 Transmission system
815-0 Electronic device (specific device)
815-1 to 815-4 Electronic device
816-0 to 816-3 Optical cable
817-0, 817-1A to 817-4A, 817-1B to 817-4B Terminal
818-01 to 818-04, 818-11 to 818-15, 818-21 to 818-25, 818-31 to 818-35, 818-41 to 818-45 Transmit/receive circuit
820-2 Endpoint terminal

The invention claimed is:

1. A first electronic device, comprising:
a first terminal;
a second terminal, wherein
the first terminal and the second terminal are for a daisy chain connection of a plurality of electronic devices,
the plurality of electronic devices comprises the first electronic device and a plurality of second electronic devices,
the first terminal comprises a plurality of first channels,
the second terminal comprises a plurality of second channels,
the plurality of first channels comprises a plurality of third channels and a plurality of fourth channels,
the plurality of second channels comprises a plurality of fifth channels and a plurality of sixth channels, and
the plurality of third channels of the first terminal are shifted and directly connected to the plurality of fifth channels of the second terminal in the first electronic device; and
a communication circuit, wherein
the communication circuit comprises a plurality of communication circuits,
the plurality of communication circuits comprises a first communication circuit and a second communication circuit,
the first communication circuit is connected to one channel of the plurality of fourth channels in the first terminal, and
the second communication circuit is connected to one channel of the plurality of sixth channels in the second terminal.

2. The first electronic device according to claim 1, wherein the communication circuit is one of a transmit/receive circuit, a transmitting circuit, or a receiving circuit.

3. The first electronic device according to claim 2, wherein
the communication circuit is the transmit/receive circuit, and
the communication circuit is configured to:
receive information about the plurality of second electronic devices;
transmit, subsequent to turn on of the first electronic device, information about the first electronic device; and
start, subsequent to the receipt of the information about the plurality of second electronic devices, one of transmission of data to the plurality of second electronic devices or reception of data to and from the plurality of second electronic devices.

4. The first electronic device according to claim 2, wherein
the communication circuit is the transmit/receive circuit, and
the communication circuit is configured to:
transmit, subsequent to turn on of the first electronic device, information about the first electronic device; and
start, subsequent to the transmission of the information about the first electronic device, one of transmission of data to the plurality of second electronic devices or reception of data from the plurality of second electronic devices.

5. The first electronic device according to claim 2, wherein
the communication circuit is the transmit/receive circuit, and
the communication circuit is configured to:
transmit, subsequent to turn on of the first electronic device, information about the first electronic device;
start, subsequent to the transmission, data transmission;
receive information about other the plurality of second electronic devices;
stop the data transmission to the plurality of second electronic devices based on the plurality of second electronic devices are transmitters; and
start data reception from the plurality of second electronic devices, wherein
the start of the data reception is subsequent to the stop of the data transmission to the plurality of second electronic devices, based on if the plurality of second electronic devices are transmitters.

6. The first electronic device according to claim 2, wherein
the communication circuit is the transmit/receive circuit, and
the communication circuit is configured to:
start data transmission, subsequent to turn on of the first electronic device to transmit information about the first electronic device;
periodically transmit the information about the first electronic device, at intervals between the data transmission;
receive information about the plurality of second electronic devices;
stop, based on the plurality of second electronic devices are transmitters, the transmission of the information about the first electronic device and the data transmission to the plurality of second electronic devices; and
start data reception from the plurality of second electronic devices subsequent to the transmission of the information about the first electronic device to the plurality of second electronic devices, wherein
based on the plurality of second electronic devices are transmitters, the start of the data reception from the plurality of second electronic devices is subsequent to the stop of the transmission of the information about the first electronic device and the data transmission to the plurality of second electronic devices.

7. The first electronic device according to claim 2, wherein the communication circuit is the transmitting circuit, and the communication circuit is configured to start data transmission, subsequent to turn on to transmit information about the first electronic device.

8. The first electronic device according to claim 2, wherein the communication circuit is the transmitting circuit, and the communication circuit is configured to:

start data transmission, subsequent to turn on to transmit information about the first electronic device; and periodically transmit the information about the first electronic device at intervals between the data transmission.

9. The first electronic device according to claim 2, wherein the communication circuit is the receiving circuit, and the communication circuit is configured to start data reception from the plurality of second electronic devices subsequent to turn on to receive information about the plurality of second electronic devices.

10. The first electronic device according to claim 1, wherein each of the first terminal and the second terminal has n*(n−1)/2 channels to allow the daisy chain connection of the plurality of electronic devices, n indicates a number of devices in the plurality of electronic devices, and n is greater than 2.

11. The first electronic device according to claim 10, wherein a plurality of third communication circuits of the plurality of communication circuits includes the first communication circuit, a plurality of fourth communication circuits of the plurality of communication circuits includes the second communication circuit, the plurality of third communication circuits are connected to (n−1) channels that constitutes the plurality of fourth channels of the n*(n−1)/2 channels of the first terminal, and the plurality of fourth communication circuits are connected to (n−1) channels that constitutes the plurality of sixth channels of the n*(n−1)/2 channels of the second terminal.

12. The first electronic device according to claim 1, wherein each of the first terminal and the second terminal has n*(n+1)/2 channels to allow the daisy chain connection of the plurality of electronic devices, n indicates a number of devices in the plurality of electronic devices, and n is greater than 1.

13. The first electronic device according to claim 12, wherein a plurality of fifth communication circuits of the plurality of communication circuits includes the first communication circuit, a plurality of sixth communication circuits of the plurality of communication circuits includes the second communication circuit, the plurality of fifth communication circuits are connected to n channels that constitutes the plurality of fourth channels of the n*(n+1)/2 channels of the first terminal, and the plurality of sixth communication circuits are connected to (n−1) channels that constitutes the plurality of sixth channels of the n*(n+1)/2 channels of the second terminal.

14. A transmission system, comprising:

a plurality of electronic devices in a daisy chain connection via cables, wherein the plurality of electronic devices comprises a first electronic device and a plurality of second electronic devices, and the first electronic device includes:

a first terminal;

a second terminal, wherein the first terminal and the second terminal are for the daisy chain connection of the plurality of electronic devices, the first terminal comprises a plurality of first channels, the second terminal comprises a plurality of second channels, the plurality of first channels comprises a plurality of third channels and a plurality of fourth channels, the plurality of second channels comprises a plurality of fifth channels and a plurality of sixth channels, and the plurality of third channels of the first terminal are shifted and directly connected to the plurality of fifth channels of the second terminal in the first electronic device; and a communication circuit, wherein the communication circuit comprises a plurality of communication circuits, the plurality of communication circuits comprises a first communication circuit and a second communication circuit, the first communication circuit is connected to one channel of the plurality of fourth channels in the first terminal, and the second communication circuit is connected to one channel of the plurality of sixth channels in the second terminal.

15. The transmission system according to claim 14, wherein a third electronic device of the plurality of electronic devices and a fourth electronic device of the plurality of electronic devices are electronic devices on two ends, respectively, of the plurality of electronic devices in the daisy chain connection, and an endpoint terminal to connect specific channels is connected to one of:

the first terminal, to which a cable is unconnected, on the third electronic device, or the second terminal, to which the cable is unconnected, on the fourth electronic device.

16. A transmission system, comprising:

a plurality of electronic devices in a daisy chain connection to a specific device via cables, wherein the plurality of electronic devices comprises a first electronic device and a plurality of second electronic devices, and the first electronic device includes:

a first terminal;

a second terminal, wherein the first terminal and the second terminal are for the daisy chain connection of the plurality of electronic devices, the first terminal comprises a plurality of first channels, the second terminal comprises a plurality of second channels, the plurality of first channels comprises a plurality of third channels and a plurality of fourth channels, the plurality of second channels comprises a plurality of fifth channels and a plurality of sixth channels, and the plurality of third channels of the first terminal are shifted and directly connected to the plurality of fifth channels of the second terminal in the first electronic device; and a communication circuit, wherein the communication circuit comprises a plurality of communication circuits, the plurality of communication circuits comprises a first communication circuit and a second communication circuit, the first communication circuit is connected to one channel of the plurality of fourth channels in the first terminal, and the second communication circuit is connected to one channel of the plurality of sixth channels in the second terminal.

17. The transmission system according to claim 16, wherein an endpoint terminal to connect specific channels is connected to the second terminal, to which a cable is unconnected, on an end opposite to the specific device of the plurality of electronic devices in the daisy chain connection.

* * * * *